US010995169B2

(12) United States Patent
Dreng et al.

(10) Patent No.: US 10,995,169 B2
(45) Date of Patent: May 4, 2021

(54) POLYETHYLENE FOR PIPES

(71) Applicant: NORNER VERDANDI AS, Stathelle (NO)

(72) Inventors: Tore Dreng, Strathelle (NO); Morten Lundquist, Stathelle (NO); Jarmo Lindroos, Stathelle (NO)

(73) Assignee: NORNER VERDANDI AS, Stathelle (NO)

(*) Notice: Subject to any disclaimer, the term of this patent is extended or adjusted under 35 U.S.C. 154(b) by 0 days.

(21) Appl. No.: 16/806,397

(22) Filed: Mar. 2, 2020

(65) Prior Publication Data
US 2020/0270383 A1 Aug. 27, 2020

Related U.S. Application Data

(62) Division of application No. 15/538,380, filed as application No. PCT/EP2015/080876 on Dec. 21, 2015, now Pat. No. 10,604,603.

(30) Foreign Application Priority Data

Dec. 22, 2014 (GB) .................................... 1422957

(51) Int. Cl.
C08F 210/16 (2006.01)
C08L 23/06 (2006.01)
F16L 9/12 (2006.01)
C08F 2/00 (2006.01)
C08F 4/76 (2006.01)
C08L 23/08 (2006.01)

(52) U.S. Cl.
CPC ............ C08F 210/16 (2013.01); C08F 2/001 (2013.01); C08F 4/76 (2013.01); C08L 23/06 (2013.01); C08L 23/0815 (2013.01); F16L 9/12 (2013.01); C08F 2500/05 (2013.01); C08F 2500/18 (2013.01)

(58) Field of Classification Search
CPC ........ C08L 23/06; C08L 9/12; C08L 23/0815; C08L 2203/18; C08L 23/08; C08F 210/16; C08F 2/001; C08F 4/76; C08F 2500/05; C08F 2500/18; C08F 110/02; C08F 4/64; C08F 10/00; C08F 10/02; C08F 210/02; C08F 297/083; C08F 2420/00; C08F 2420/04; C08F 2/38; C08F 4/6428; C08F 4/65927; C08F 2500/12; F16L 9/12; F16L 210/16; F16L 2/001; F16L 4/65927; F16L 110/02; F16L 2500/18; F16L 2500/05; C07F 17/00; B29C 48/09
USPC ....................................................... 525/240
See application file for complete search history.

(56) References Cited

U.S. PATENT DOCUMENTS

| 5,473,020 | A | 12/1995 | Peifer et al. | |
|---|---|---|---|---|
| 5,492,985 | A | 2/1996 | Peifer et al. | |
| 7,662,894 | B2* | 2/2010 | Hamed | C08F 10/02 526/113 |
| 9,012,564 | B2* | 4/2015 | Pettijohn | C08J 5/18 524/579 |
| 10,604,603 | B2* | 3/2020 | Dreng | C08L 23/06 |
| 2005/0153148 | A1 | 7/2005 | Shannon et al. | |
| 2008/0196922 | A1* | 8/2008 | Van Marion | C08L 23/04 174/110 PM |
| 2010/0120981 | A1 | 5/2010 | Shin et al. | |
| 2010/0234545 | A1 | 9/2010 | Shim et al. | |
| 2011/0091674 | A1 | 4/2011 | Backman et al. | |
| 2011/0218310 | A1 | 9/2011 | Severn et al. | |
| 2011/0262671 | A1 | 10/2011 | Pakkanen et al. | |
| 2012/0015123 | A1 | 1/2012 | Kwon et al. | |
| 2012/0041149 | A1 | 2/2012 | Shin et al. | |
| 2012/0104643 | A1 | 5/2012 | Ameye et al. | |

(Continued)

FOREIGN PATENT DOCUMENTS

| CN | 1127759 A | 7/1996 |
|---|---|---|
| CN | 103930452 A | 7/2014 |

(Continued)

OTHER PUBLICATIONS

U.S. Appl. No. 15/538,380, filed Jun. 21, 2017, 2017/0369612.
U.S. Appl. No. 15/538,380, filed Jun. 21, 2017, U.S. Pat. No. 10,604,603.
U.S. Appl. No. 16/228,987, filed Dec. 21, 2018, 2019/0185594.
Piel, Polymerization of Ethene and Ethene-co-α-Olefin: Investigations on Short-and Long-Chain Branching and Structure-Property Relationships. Dissertation, submitted to Department of Chemistry, University of Hamburg, in partial fulfillment of the requirements for the German academic degree Dr. rer. nat. 159 pages (2005).
Sigma-Aldrich, Safety Data Sheet, Bis(butylcyclopentadienyl)zirconium(IV) dichloride. sigma-aldrich.com, 6 pages (2013).

(Continued)

Primary Examiner — Douglas J McGinty
(74) Attorney, Agent, or Firm — McCarter & English, LLP; Yu Lu

(57) ABSTRACT

The present invention provides a process for the preparation of a multimodal polyethylene comprising: (i) polymerising ethylene and optionally an α-olefin comonomer in a first polymerisation stage to produce a first ethylene polymer; and (ii) polymerising ethylene and optionally an α-olefin comonomer, in the presence of said first ethylene polymer, in a second polymerisation stage, wherein the first and second polymerisation stages are carried out in the presence of an unsupported metallocene catalyst and each polymerisation stage produces at least 5% wt of the multimodal polyethylene, and the multimodal polyethylene has a multimodal molecular weight distribution, a molecular weight of at least 50,000 g/mol and a bulk density of at least 250 g/dm³, and wherein a solution of the unsupported metallocene catalyst in a solvent is employed. The present invention also provides a multimodal polyethylene, a process for preparing a pipe comprising preparing a multimodal polyethylene and extruding the multimodal polyethylene to produce a pipe, and a pipe obtained by such a process.

19 Claims, 4 Drawing Sheets

(56) References Cited

U.S. PATENT DOCUMENTS

Figure 1:
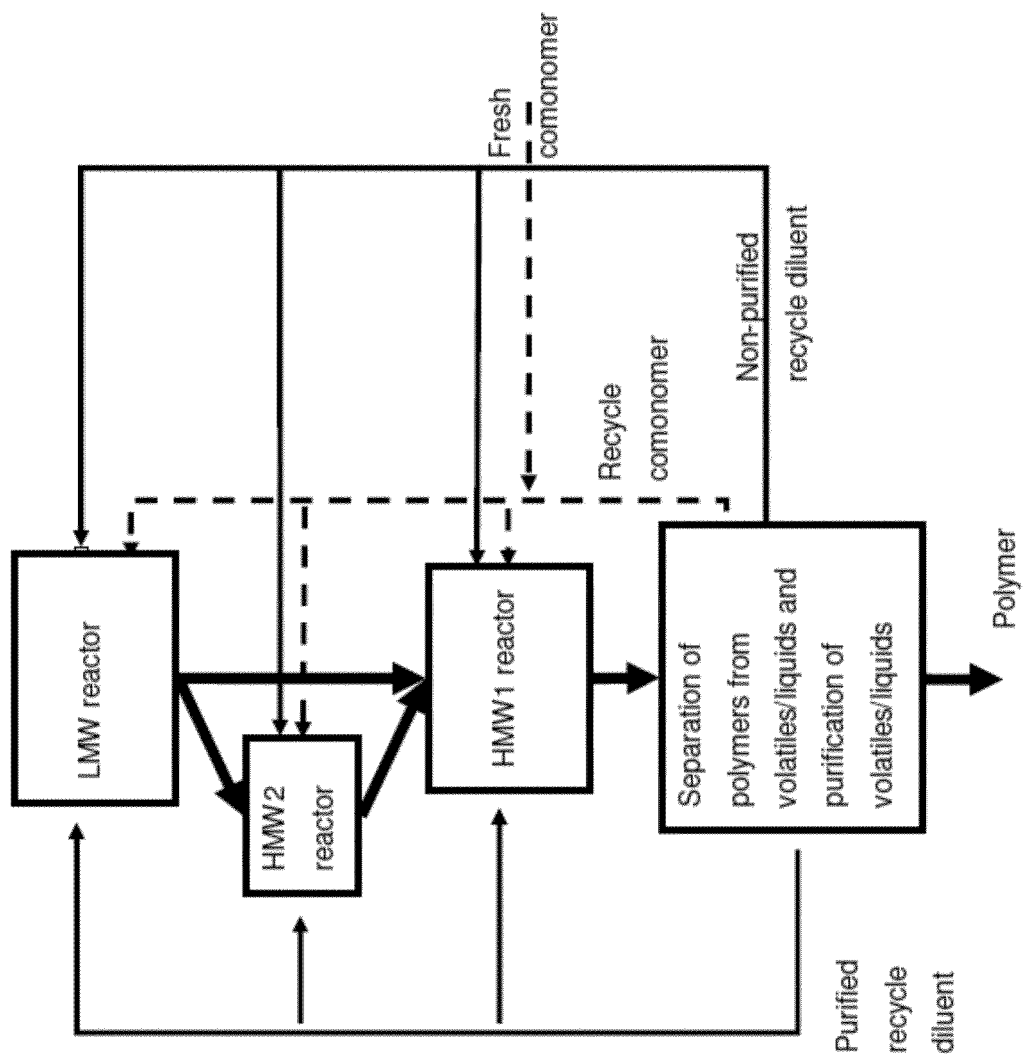

| | | |
|---|---|---|
| 2014/0288249 A1 | 9/2014 | Sun et al. |
| 2014/0378694 A1 | 12/2014 | Al-Humydi et al. |
| 2017/0369612 A1* | 12/2017 | Dreng .................. C08F 4/76 |
| 2019/0185594 A1* | 6/2019 | Dreng .................. F16L 9/127 |

FOREIGN PATENT DOCUMENTS

| | | |
|---|---|---|
| JP | 2001-527097 | 12/2001 |
| JP | 2001-527097 A | 12/2001 |
| JP | 2013-534560 A | 9/2013 |
| JP | 2015-505573 A | 2/2015 |
| RU | 2465291 C2 | 10/2012 |
| RU | 2468039 C2 | 11/2012 |
| RU | 2472817 C2 | 1/2013 |
| RU | 2491298 C2 | 8/2013 |
| WO | WO-1992/15619 A1 | 9/1992 |
| WO | WO-1998/02246 A1 | 1/1998 |
| WO | WO-1998/37103 A1 | 8/1998 |
| WO | WO-1998/58001 A1 | 12/1998 |
| WO | 1999/3530 A1 | 1/1999 |
| WO | WO-1999/32530 A1 | 7/1999 |
| WO | WO-1999/32531 A1 | 7/1999 |
| WO | WO-2000/18813 A1 | 4/2000 |
| WO | WO-2003/051934 A2 | 6/2003 |
| WO | WO-2009/147022 A1 | 12/2009 |
| WO | WO-2012/112259 A2 | 8/2012 |
| WO | WO-2013/091837 A1 | 6/2013 |
| WO | WO-2013/113797 A1 | 8/2013 |
| WO | WO-2015/162212 A1 | 10/2015 |

OTHER PUBLICATIONS

Sigma-Aldrich, Safety Data Sheet, Dichloro[rac-ethylenebis(4,5,6,7-tetrahydro-1-indenyl)]zirconium (IV). sigma-aldrich.com, 7 pages (2012).

Severn, Methylaluminoxane (MAO), Silica and a Complex: The "Holy Trinity" of Supported Sing-site Catalyst. Tailor-Made Polymers: via Immobilization of Alpha-Olefin Polymerization Catalysts. Wiley-VCH, Chapter 4, pp. 95-138 (2008).

International Search Report and Written Opinion for Application No. PCT/GB2017/051892, dated Dec. 7, 2017, 18 pages.

* cited by examiner

POLYETHYLENE FOR PIPES

CROSS-REFERENCE TO RELATED APPLICATIONS

This application is a divisional application of U.S. application Ser. No. 15/538,380, filed on Jun. 21, 2017, which is the U.S. national stage application, filed under 35 U.S.C. § 371(c), based on International Application No. PCT/EP2015/080876, filed on Dec. 21, 2015, which claims priority to United Kingdom Patent Application No. 1422957.9, filed on Dec. 22, 2014. The entire contents of each of the aforementioned applications are incorporated herein by reference.

INTRODUCTION

The present invention relates to a multistage polymerisation process for the preparation of a multimodal polyethylene, wherein at least the first and second polymerisation stages are carried out in the presence of an unsupported metallocene catalyst. The invention also relates to the multimodal polyethylene produced by the process which has a multimodal molecular weight distribution, a molecular weight of at least 50,000 g/mol and a bulk density of at least 250 g/dm$^3$.

BACKGROUND

Polyethylene (PE), and in particular high density polyethylene (HDPE), is the most commonly used material for the production of pipes. Polyethylene used for the manufacture of HDPE pipes needs to meet certain mechanical criteria, such as impact resistance, toughness and scratch resistance, as well as chemical requirements, e.g. resistance to corrosion. The pipes are often used at high inner pressures and subjected to external mechanical forces. Although the overall pressure is usually well below the yield stress of the polymer, mechanical failure almost always occurs before the polymer is chemically degraded. It is generally accepted that this is due to the existence of local heterogeneities of micrometer size in the polyethylene pipe causing a strong localized stress distribution around the flaws that exceeds the yield stress. Such a stress concentration induces the formation and growth of a craze by rupture of the craze fibrils. In this respect it is of high importance to use PE with as low local heterogeneities as possible. Normally these heterogeneities originate from supported catalysts where, especially when metallocene catalysts are concerned, silica or other related inorganic carriers are used.

Polyethylene pipes are particularly suited for non-conventional pipe installation due to their flexibility, deformability and availability in long lengths. The widespread use of modern relining techniques and fast pipe installation practices call for high material requirements and guarantees of performance, particularly with respect to the effect of scratches, notches, nicks and impingements that are inherent to these techniques and facilitates slow crack growth (SCG). When installing pipes by modern no-dig or trenchless installation methods (e.g. pipe bursting, horizontal direction drilling) the pipe is dragged horizontally through the ground. While often highly advantageous in that the surface of the ground, e.g. roads and other installations, need not be disturbed and the installation cost significantly reduced, on the other hand, the no-dig methods give the disadvantage of a high tendency for protruding stones, rocks etc. to scratch the outer surface of the pipe in the longitudinal direction. Furthermore, at the bottom of such longitudinal scratches, there will be a very high local tangential stress when pressure is applied inside the pipe. Thus, unfortunately, such scratches are very harmful since they often start cracks propagating through the wall that would otherwise never even have started.

These requirements on the performance level of pipes, in turn, mean that the polyethylene used for their production must meet certain requirements. Generally polyethylene used for pipe production has the following properties:

| Property | Units | Suitable range |
|---|---|---|
| Molecular weight (Mw) | g/mol | 100,000-500,000 |
| MFR$_5$ | g/10 min | 0.2-1.4 (EN12201) |
| Density | g/cm$^3$ | 935-960 |

Commerically available polyethylene for pipe production is generally prepared either by using a chromium or a Ziegler Natta catalyst. Monomodal HDPE made in a single reactor with a chromium (Phillips) catalyst gives a relatively poor property profile with respect to demanding pressure pipe applications. HDPE pipe made using Ziegler Natta catalysts are usually prepared with two reactors operating in series; one reactor making a lower molecular weight homopolymer and one reactor making a higher molecular weight polymer containing comonomer which gives a better property profile compared to monomodal chromium HDPE. Ziegler Natta catalysts enable high molecular weight, high density polyethylene to be produced which provides the polyethylene with its required mechanical properties. The disadvantage of the use of Ziegler Natta catalysts, however, is that the polyethylene tends to have inhomogeneous comonomer incorporation.

Metallocene catalysts are attractive to use in polyethylene pipe production because they achieve much more homogeneous comonomer incorporation in the polymer compared to Ziegler Natta and chromium catalysts. Here, homogeneous comonomer incorporation means that comonomer is incorporated in similar quantities into polymer chains across the whole molecular weight range. In contrast with Ziegler Natta catalysts comonomer is typically incorporated only in polymer chains with certain molecular weight. The improved comonomer incorporation property with metallocenes will improve significantly, for example, slow crack growth and rapid crack propagation behaviour of the polymer which has crucial impact on the pipe properties.

Currently metallocene catalysts are exploited to a much lesser extent commercially for the production of polyethylene for pipe production than Ziegler Natta catalysts. When metallocene catalysts are employed in commercial scale processes, they tend to be used on external carriers or supports. The use of supports avoids the problems of reactor fouling, poor polymer morphology and low polymer bulk density which are typically encountered with the use of unsupported metallocenes. Supported metallocene catalysts, however, have relatively low activities and invariably yield polyethylene of relatively low molecular weight which means they are not suitable for pipe production. Due to the low polymerisation activity, supported metallocene catalysts also yield polyethylene with high ash content and high gel content. As described above, due to local heterogeneities in the polymer structure high ash content and high gel content, often lead to mechanical failures in the pipe, meaning cracks and breakages. They also often affect the pipe appearance and performance by introducing roughness on the inner and outer surface which has an effect e.g. on the flowability of liquids. Also, high ash content has an effect on the electrical properties of the polymer leading to higher conductivity.

Silica is typically used as a carrier in supported metallocene catalysts and thus remains in the produced polymer. Silica is a hard material and will scratch steel. Silica particles present in a polymer will scratch the metal surfaces of polymer melt handling equipment, e.g. extruders and dies, both in the polymer production plant as well as in the later melt forming into useful products as the polymer flows along the metal surfaces, under a melt pressure of hundreds of bars. The continued scratching over time results in the polymer melt handling equipment eventually getting worn out.

Also, the level of foreign, e.g. silica, particles in the produced polymer is extremely important because the amount of, e.g. catalyst, residues inside the polymer plays an important role in determining the application where the polymer can be used. For example, film with high strength and clarity, electronics, optical media and pharmaceutical packaging require minimum level of residues in the polymer.

WO98/58001 discloses a process for the preparation of polyethylene for pipe production wherein a multistage polymerisation using a metallocene catalyst is carried out. Hydrogen is present in the first stage of the polymerisation but is entirely consumed therein so that the second stage polymerisation occurs in the absence of hydrogen. The first stage polymerisation produces a lower molecular weight polymer and the second stage polymerisation a higher molecular weight polymer.

WO98/58001 is focussed on the use of supported metallocene catalysts. It teaches that it is particularly desirable that the metallocene complex is supported on a solid substrate for use in the polymerisations. The preferred substrates are porous particulates such as inorganic oxides, e.g. silica, alumina, silica-alumina, zirconia, inorganic halides or porous polymer particles. All of the examples in WO98/58001 employ supported metallocene catalysts.

WO98/58001 teaches that its process yields a polyethylene having a $MFR_2$ of 0.01 to 100 g/10 min, a weight average molecular weight of 30,000 to 500,000 g/mol, a melting point of 100-165° C. and a crystallinity of 20 to 70%. The examples of WO98/58001 illustrate the preparation of numerous polyethylenes. The $MFR_2$ values of the polymers produced is always greater than 1 g/10 min (c.f. the above 0.01 g/10 min minimum of the range) and in many cases is significantly greater with some examples producing polymers having $MFR_2$ values of 43 and 32 g/10 min. None of the polyethylenes produced in the examples of WO98/58001 have a $MFR_2$ of <0.1 g/10 min ($MFR_5$=0.2-0.5 g/10 min for pressure pipe) which is the ideal value for polyethylene pipe production. As shown in the examples section later, this is consistent with the Applicant's finding that it is not possible to produce polyethylene suitable for pipe production (i.e. high molecular weight and low $MFR_2$) using the supported catalyst illustrated in WO98/58001.

US2011/0091674 discloses multimodal copolymers of ethylene and their preparation in a multistage polymerisation process carried out in the presence of a metallocene catalyst. The catalyst is used in solid form, either on a particulate support such as silica, on solidified alumoxane, or as solid particles prepared using emulsion solidification technology.

WO2013/113797 discloses a process for the production of multimodal polyethylene using a three stage polymerisation process. WO2013/113797 is focussed on the use of a Ziegler Natta catalyst system for the polymerisation process.

WO2013/091837 discloses bridged bis(indenyl) ligands, methods for their preparation, and their use in the preparation of metallocene complexes which may be used in the polymerisation of ethylene.

There is a need to develop a metallocene based polyethylene polymerisation process which proceeds with low reactor fouling and high activity and which yields a polyethylene suitable for pipe production. The polyethylene must have a high molecular weight, a low $MFR_5$, a high bulk density (indicating good particle morphology) and ideally a low ash and gel content.

SUMMARY OF INVENTION

Viewed from a first aspect the present invention provides a process for the preparation of a multimodal polyethylene comprising:
(i) polymerising ethylene and optionally an α-olefin comonomer in a first polymerisation stage to produce a first ethylene polymer; and
(ii) polymerising ethylene and optionally an α-olefin comonomer, in the presence of said first ethylene polymer, in a second polymerisation stage,
wherein said first and second polymerisation stages are carried out in the presence of an unsupported metallocene catalyst and each polymerisation stage produces at least 5% wt of said multimodal polyethylene, and
said multimodal polyethylene has a multimodal molecular weight distribution, a molecular weight of at least 50,000 g/mol and a bulk density of at least 250 g/dm$^3$, and wherein a solution of said unsupported metallocene catalyst in a solvent is employed.

Viewed from a further aspect the present invention provides a multimodal polyethylene obtainable by a process as hereinbefore defined.

Viewed from a further aspect the present invention provides a multimodal polyethylene obtained by a process as hereinbefore defined.

Viewed from a further aspect the present invention provides a metallocene multimodal polyethylene comprising:
i) a multimodal molecular weight distribution;
ii) a molecular weight of at least 50,000 g/mol;
iii) a $MFR_2$ of less than 0.2 g/10 min;
iv) a $MFR_5$ of less than 1 g/10 min;
v) a bulk density of at least 250 g/dm$^3$; and
vi) an ash content of less than 800 ppm wt.

Viewed from a further aspect the present invention provides a process for preparing a pipe comprising:
i) preparing a multimodal polyethylene by the process as hereinbefore defined; and
ii) extruding said multimodal polyethylene to produce pipe.

Viewed from a further aspect the present invention provides a pipe obtainable by a process as hereinbefore defined.

Viewed from a further aspect the present invention provides a pipe obtained by a process as hereinbefore defined.

Viewed from a further aspect the present invention provides a pipe comprising metallocene multimodal polyethylene as hereinbefore defined.

Definitions

As used herein the term "polyethylene" refers to a polymer that comprises at least 50% wt, still more preferably at least 75% wt, still more preferably at least 85% wt and yet more preferably at least 90% wt units derived from ethylene.

As used herein the term "ethylene homopolymer" refers to a polymer which consists essentially of repeat units deriving from ethylene. Homopolymers may, for example, comprise at least 99% wt, preferably at least 99.5% wt, more preferably at least 99.9% wt and still more preferably at least 99.95% wt, e.g. 100% wt, of repeat units deriving from ethylene.

As used herein the term "ethylene copolymer" refers to a polymer comprising repeat units from ethylene and at least one other monomer. In typical copolymers at least 0.05% wt, more preferably at least 0.1% wt and still more preferably at least 0.4% wt of repeat units derive from at least one monomer other than ethylene. Typically ethylene copolymers will not comprise more than 15% by weight of repeat units deriving from monomers other than ethylene.

As used herein % wt is expressed relative to the weight of polyethylene unless otherwise specified.

As used herein the terms "lower" and "higher" are used relatively. Thus a lower molecular weight ethylene polymer has a lesser molecular weight than a higher molecular weight polymer.

As used herein the term LMW polymer refers to the lower molecular weight ethylene polymer.

As used herein the term HMW1 refers to the first higher molecular weight ethylene copolymer. As used herein the term HMW2 refers to the second higher molecular weight ethylene polymer. HMW1 and HMW2 each have higher molecular weights than the LMW polymer. Either of HMW1 or HMW2 may have the highest molecular weight or they may have the same molecular weight.

Whenever the term "molecular weight" is used, the weight average molecular weight (Mw) is meant unless otherwise specified.

As used herein the term "multimodal" refers to a polymer comprising a plurality of components or fractions, which have been produced under multistage polymerisation conditions resulting in different weight average molecular weights and molecular weight distributions for the components and/or in different comonomer contents. The prefix "multi" refers to the number of different components present in the polymer. Thus, for example, a polymer consisting of two components only is called "bimodal" and a polymer consisting of three components only is called "trimodal".

As used herein the term "multimodal molecular weight distribution" refers to the form of the molecular weight distribution curve, i.e. the appearance of the graph of the polymer weight fraction as a function of its molecular weight. A polyethylene having a multimodal molecular weight distribution can show two or more maxima or at least be distinctly broadened in comparison with the curves for the individual components. In addition, multimodality may show as a difference in melting or crystallisation temperature curves of components. In contrast a polymer comprising one component produced under constant polymerisation conditions is referred to herein as unimodal.

As used herein the term "multimodal composition" refers to a composition comprising a plurality of components or fractions, which are each different in composition. Preferably the components or fractions each have a different constituent composition. Thus, for example, a composition comprising an ethylene homopolymer, an ethylene copolymer comprising 0.1% wt comonomer is a multimodal composition, specifically a bimodal composition.

As used herein, the term "multistage polymerisation" refers to a polymerisation which is carried out in two or more stages. Generally each stage is carried out in a separate reactor. The term multistage polymerisation is used interchangeably with multistep polymerisation.

As used herein the term "polymerisation stage" refers to a polymerisation step wherein the amount of polyethylene produced constitutes at least 1% wt, preferably at least 3% wt and more preferably at least 5% wt of the final multimodal polyethylene. Some polymerisations comprise a prepolymerisation stage wherein the polymerisation catalyst is polymerised with a relatively small amount of monomer. A prepolymerisation typically produces up to 3% wt and certainly does not produce more than 5% wt of the final polyethylene and is not considered herein to be a polymerisation stage.

As used herein the term catalyst system refers to the total active entity that catalyses the polymerisation reaction. Typically the catalyst system is a coordination catalyst system comprising a transition metal compound (the active site precursor) and an activator (sometimes referred to as a cocatalyst) that is able to activate the transition metal compound.

As used herein the term "metallocene catalyst" refers to a complex of a group 3-10 metal having at least two ligands wherein each of the ligands comprise a delocalised pi system of electrons.

As used herein the term "unsupported" refers to the absence of an external carrier. In other words the metallocene is not supported on or carried on another external carrier. Typical examples of supports are silica and alumina.

As used herein the term "slurry polymerisation" refers to a polymerisation wherein the polymer forms as a solid in a liquid. The liquid may be a monomer of the polymer. In the latter case the polymerisation is sometimes referred to as a bulk polymerisation. The term slurry polymerisation encompasses what is sometimes referred to in the art as supercritical polymerisation, i.e. a polymerisation wherein the polymer is a solid suspended in a fluid that is relatively close to its critical point, or if the fluid is a mixture, its pseudocritical point. A fluid may be considered relatively close to its critical point if its compressibility factor is less than double its critical compressibility factor or, in the case of a mixture, its pseudocritical compressibility factor.

As used herein the term "hydrocarbyl group" covers any group comprising carbon and hydrogen only.

As used herein the term "halogen" encompasses atoms selected from the group consisting of F, Cl, Br and I.

As used herein the term "alkyl" refers to saturated, straight chained, branched or cyclic groups. Alkyl groups may be substituted or unsubstituted.

As used herein the term "alkenyl" refers to straight chained, branched or cyclic group comprising a double bond. Alkenyl groups may be substituted or unsubstituted.

As used herein the term "alkynyl" refers to straight chained, branched or cyclic groups comprising a triple bond. Alkynyl groups may be substituted or unsubstituted.

As used herein the term "cycloalkyl" refers to a saturated or partially saturated mono- or bicyclic alkyl ring system containing 3 to 10 carbon atoms. Cycloalkyl groups may be substituted or unsubstituted.

As used herein the term "alkoxy" refers to O-alkyl groups, wherein alkyl is as defined above.

As used herein the term "haloalkyl" refers to saturated, straight chained, branched or cyclic groups in which one or more hydrogen atoms are replaced by a halo atom, e.g. F or Cl, especially F.

As used herein the term "fluorocarbon" refers to a hydrocarbon in which one or more hydrogen atoms are replaced by a fluorine atom.

As used herein the term "fluorocarbyl" refers to any group comprising carbon, fluorine and hydrogen.

As used herein the term "fluorocarbonsurfactant" refers to synthetic organofluorine chemical compounds that have multiple fluorine atoms; they can be polyfluorinated or perfluorinated, and they have a hydrophilic head group, e.g. $CO_2H$, $SO_3H$, OH, and a hydrophobic fluorinated tail.

As used herein the term "aryl" refers to a group comprising at least one aromatic ring. The term aryl encompasses heteroaryl as well as fused ring systems wherein one or more aromatic ring is fused to a cycloalkyl ring. Aryl groups may be substituted or unsubstituted.

As used herein the term "arylalkyl" or "aralkyl" refers to an alkyl group as hereinbefore defined that is substituted with an aryl group as hereinbefore defined.

As used herein the term "arylalkenyl" refers to an alkenyl group as hereinbefore described that is substituted with an aryl group as hereinbefore defined.

As used herein the term "aryloxy" refers to O-aryl groups, wherein aryl is as defined above.

As used herein the term "arylalkoxy" refers to O-arylalkyl groups, wherein arylalkyl is as defined above.

As used herein the term "heteroaryl" refers to a group comprising at least one aromatic ring in which one or more ring carbon atoms are replaced by at least one hetero atom such as —O—, —N— or —S—.

Optional substituents that may be present on alkyl, cycloalkyl, alkenyl and alkynyl groups as well as the alkyl or alkenyl moiety of an arylalkyl or arylalkenyl group respectively include $C_{1-16}$ alkyl or $C_{1-16}$ cycloalkyl wherein one or more non-adjacent C atoms may be replaced with O, S, N, C=O and —COO—, substituted or unsubstituted $C_{5-14}$ aryl, substituted or unsubstituted $C_{5-14}$ heteroaryl, $C_{1-16}$ alkoxy, $C_{1-16}$ alkylthio, halo, e.g. fluorine and chlorine, cyano and arylalkyl.

DETAILED DESCRIPTION OF INVENTION

The process of the present invention is a multistage polymerisation process, wherein ethylene and optionally an α-olefin comonomer, is polymerised in a first polymerisation stage to produce a first ethylene polymer and then, in the presence of the first ethylene polymer, a second polymerisation stage with ethylene and optionally an α-olefin comonomer is carried out. The first and second polymerisation stages are both carried out with an unsupported metallocene catalyst. Advantageously no reactor fouling occurs, the activity of the unsupported catalyst is high and the overall activity of the polymerisations is high. The multimodal polyethylene obtained by the process of the present invention has a multimodal molecular weight distribution, a surprisingly high molecular weight (Mw) of at least 50,000 g/mol and a bulk density, reflecting good particle morphology, of at least 250 g/dm³. The multimodal polyethylene is therefore suitable for extrusion to form pipes.

Metallocene Catalyst

The process of the present invention employs an unsupported metallocene catalyst. Thus the metallocene catalysts of the present invention do not include a carrier such as silica or alumina. The absence of a support brings a number of advantages including higher catalytic activity per mol of metal compared to supported catalysts. The unsupported metallocene catalyst employed in the process of the invention produces multimodal polyethylene of higher molecular weight, lower $MFR_2/5$ and comparable bulk density to the corresponding supported metallocene catalyst under the same conditions. The unsupported metallocene catalyst also unexpectedly produces multimodal polyethylene with low ash content and low gels. Advantageously the multimodal polyethylene obtained in the process is suitable for the production of pipes.

The metallocene catalyst is a complex of a group 3 to 10 metal having at least two ligands wherein each of the ligands comprises a delocalised pi system of electrons. Preferably the ligand comprises a cyclopentadienyl group. The ligand may be, for example, substituted or unsubstituted cyclopentadienyl, substituted or unsubstituted indenyl, substituted or unsubstituted fluorenyl or substituted or unsubstituted tetrahydroindenyl. Suitable ligands therefore include those of the following structures, which may each be optionally substituted:

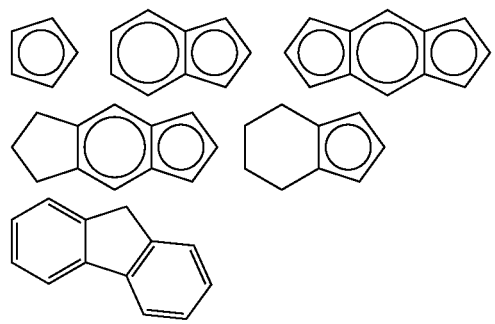

Metallocenes comprising substituted or unsubstituted cyclopentadienyl, substituted or unsubstituted indenyl or substituted or unsubstituted tetrahydroindenyl ligands are preferred. Metallocenes comprising substituted or unsubstituted tetrahydroindenyl ligands are particularly preferred.

In preferred metallocenes for use in the process of the invention, two ligands are present, optionally joined by a bridging group. The substitution pattern on the two ligands may be the same or different. The metallocenes employed in the present invention may be symmetrical or asymmetrical.

The metallocene preferably comprises at least one metal ion of group 3 to 10, more preferably group 4 to 6 and still more preferably group 4. The metal ion is r-bonded to the pi electrons of the ligands. Preferred metal ions are formed by a metal selected from Zr, Hf or Ti, more preferably Zr or Hf and still more preferably Zr.

Preferred metallocenes are compounds of formula (I):

$$(Cp)_2L_nMX_2 \quad (I)$$

wherein
each Cp is independently a cyclic group having a delocalised system of pi electrons;
L is a bridge of 1-7 atoms;
n is 0 or 1;
M is a transition metal of Group 3 to 10, preferably of Group 4 to 6, more preferably Group 4, e.g. Ti, Zr or Hf, especially Zr or Hf and particularly Zr; and
each X is independently a sigma-ligand.

In compounds of formula (I) Cp is preferably an unsubstituted or substituted ligand comprising at least one cyclopentadienyl group. More preferably Cp is a substituted or unsubstituted cyclopentadienyl, substituted or unsubstituted indenyl or substituted or unsubstituted tetrahydroindenyl. Still more preferably Cp is a cyclopentadienyl, indenyl or tetrahydroindenyl, each optionally substituted as defined above. Yet more preferably Cp is a substituted or unsubstituted tetrahydroindenyl.

Preferably the one or more optional substituent(s) present on Cp groups are independently selected from halogen, hydrocarbyl (e.g. $C_{1-20}$ alkyl, $C_{2-20}$ alkenyl, $C_{2-20}$ alkynyl, $C_{3-12}$ cycloalkyl, $C_{6-20}$ aryl or $C_{7-20}$ arylalkyl), $C_{3-12}$ cycloalkyl which contains 1, 2, 3 or 4 heteroatom(s) in the ring moiety, $C_{6-20}$ heteroaryl, $C_{1-20}$ haloalkyl, —SiR"$_3$, —OSiR"$_3$, —SR", —PR", —OR" or —NR"$_2$, wherein each R" is independently a hydrogen or hydrocarbyl, e.g. $C_{1-20}$ alkyl, $C_{2-20}$ alkenyl, $C_{2-20}$ alkynyl, $C_{3-20}$ cycloalkyl or $C_{6-20}$ aryl; or e.g. in case of —NR"$_2$, the two substituents R" can form a ring, e.g. five or six-membered ring, together with the nitrogen atom to which they are attached.

In some preferred compounds of formula (I) each Cp is substituted by 1, 2, 3 or 4 substituents as defined above, preferably 1, 2 or 3 substituents and more preferably 1 or 2 substituents, e.g. 1 substituent. Preferred substituents are selected from $C_{1-20}$ alkyl, $C_{6-20}$ aryl, $C_{7-20}$ arylalkyl (wherein the aryl ring alone or as part of a further moiety may further be substituted as indicated above), —OSiR"$_3$, wherein R" is independently a hydrogen or hydrocarbyl, e.g. $C_{1-20}$ alkyl, $C_{2-20}$ alkenyl, $C_{2-20}$ alkynyl, $C_{3-20}$ cycloalkyl or $C_{6-20}$ aryl; or e.g. in case of —NR"$_2$, the two substituents R" can form a ring, e.g. five or six-membered ring, together with the nitrogen atom to which they are attached. $C_{1-20}$ alkyl is a particularly preferred substituent. Methyl, ethyl, propyl (e.g. n-propyl), butyl (e.g. n-butyl), pentyl (e.g. n-pentyl) and hexyl (e.g. n-hexyl) are especially preferred. In other preferred compounds of formula (I) each Cp is unsubstituted.

In some preferred compounds of formula (I) n is 0, i.e. there is no bridge between ligands. In other preferred compounds of formula (I) n is 1.

In compounds of formula (I) when n is 1, L is preferably a bridge of 1-4 C atoms and 0-4 heteroatoms, wherein the heteroatom(s) can be, e.g. Si, Ge and/or O atom(s), wherein each of the bridge atoms may bear independently substituents (e.g. $C_{1-20}$ alkyl, tri($C_{1-20}$ alkyl)silyl, tri($C_{1-20}$alkyl) siloxy or $C_{6-20}$ aryl substituents); or a bridge of 1-3, e.g. one or two heteroatoms, such as Si, Ge and/or O atom(s), e.g. —SiR'''$_2$, wherein each R''' is independently $C_{1-20}$ alkyl, $C_{3-12}$ cycloalkyl, $C_{6-20}$ aryl or tri($C_{1-20}$ alkyl)silyl, such as trimethylsilyl. More preferably L if present (i.e. n is 1) is a methylene, ethylene or silyl bridge, whereby the silyl may be substituted as defined above. More preferably when L is present it is a methylene or ethylene bridge and especially preferably an ethylene bridge.

In compounds of formula (I) M is preferably a Group 4 transition metal, e.g. Ti, Zr or Hf, especially Zr or Hf and particularly Zr. The oxidation state of the metal ion is primarily governed by the nature of the metal ion in question and the stability of the individual oxidation states of each metal ion. Preferably, however, the metal ion will be in the 3+ or 4+ oxidation state, and especially 4+.

In compounds of formula (I) each X independently is preferably H, halogen, $C_{1-20}$ alkyl, $C_{1-20}$ alkoxy, $C_{2-20}$ alkenyl, $C_{2-20}$ alkynyl, $C_{3-12}$ cycloalkyl, $C_{6-20}$ aryl, $C_{6-20}$ aryloxy, $C_{7-20}$ arylalkyl, $C_{7-20}$ arylalkenyl, —SR", —PR"$_3$, SiR"$_3$, —OSiR"$_3$, —NR"$_2$ or —CH$_2$Y wherein Y is $C_{6-20}$ aryl, $C_{6-20}$ heteroaryl, $C_{1-20}$ alkoxy, $C_{6-20}$ aryloxy, —NR"$_2$, —SR", —PR"$_3$, —SiR"$_3$, or —OSi"$_3$ and wherein each R" is independently a hydrogen or hydrocarbyl, e.g. $C_{1-20}$ alkyl, $C_{2-20}$ alkenyl, $C_{2-20}$ alkynyl, $C_{3-20}$ cycloalkyl or $C_{6-20}$ aryl; or e.g. in case of —NR"$_2$, the two substituents R" can form a ring, e.g. five or six-membered ring, together with the nitrogen atom to which they are attached. Preferably X is halogen, $C_{1-20}$ alkyl, $C_{1-20}$ alkoxy, $C_{6-20}$ aryl, $C_{7-20}$ arylalkenyl or NR"$_2$ as defined above, e.g. —N($C_{1-20}$ alkyl)$_2$. More preferably each X is halide, particularly preferably Cl.

Preferably the ligands present on the metallocene are identical. Preferably the ligands are present in equivalent positions on each ring. Preferably the metallocene compounds of the invention are in racemic form.

One preferred subgroup of metallocenes are those of formula (II):

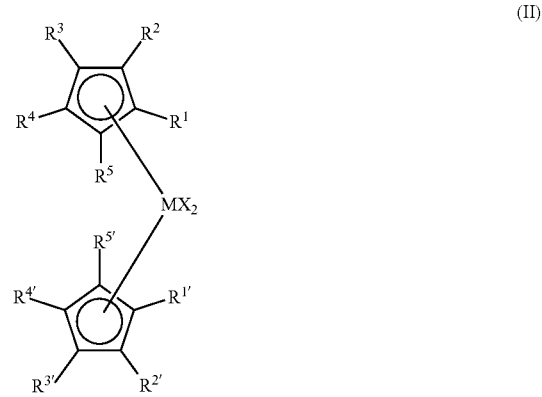

wherein
M is a transition metal of Group 4 to 6, such as Group 4, e.g. Ti, Zr or Hf, especially Zr or Hf and particularly Hf
each X is independently a sigma-ligand, preferably halogen, $C_{1-20}$ alkyl, $C_{1-20}$ alkoxy, $C_{6-20}$ aryl, $C_{7-20}$ arylalkenyl or —NR"$_2$ as defined above, e.g. —N($C_{1-20}$ alkyl)$_2$;
$R^1$ and $R^{1'}$ are each independently hydrocarbyl (e.g. $C_{1-20}$ hydrocarbyl group such as $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl, $C_{7-20}$ alkylaryl or $C_{7-20}$ arylalkyl); and
$R^2$, $R^{2'}$, $R^3$, $R^{3'}$, $R^4$, $R^{4'}$, $R^5$ and $R^{5'}$ are each independently H or a $C_{1-20}$ hydrocarbyl.

In preferred compounds of formula (II) M is a Group 4 transition metal, e.g. Ti, Zr or Hf, especially Zr or Hf and particularly Hf.

In preferred compounds of formula (II) X is preferably H, halogen, $C_{1-20}$ alkyl, $C_{1-20}$ alkoxy, $C_{2-20}$ alkenyl, $C_{2-20}$ alkynyl, $C_{3-12}$-cycloalkyl, $C_{6-20}$ aryl, $C_{6-20}$ aryloxy, $C_{7-20}$ arylalkyl, $C_{7-20}$ arylalkenyl, —SR", —PR"$_3$, —SiR"$_3$, —OSiR"$_3$, —NR"$_2$ or —CH$_2$—Y, wherein Y is $C_{6-20}$ aryl, $C_{6-20}$ heteroaryl, $C_{1-20}$ alkoxy, $C_{6-20}$ aryloxy, NR"$_2$, —SR", —PR"$_3$, —SiR"$_3$, or —OSiR"$_3$ and wherein each R" is independently a hydrogen or hydrocarbyl, e.g. $C_{1-20}$ alkyl, $C_{2-20}$ alkenyl, $C_{2-20}$ alkynyl, $C_{3-12}$ cycloalkyl or $C_{6-20}$ aryl; or e.g. in case of —NR"$_2$, the two substituents R" can form a ring, e.g. five- or six-membered ring, together with the nitrogen atom to which they are attached. Preferably X is halogen, $C_{1-20}$ alkyl, $C_{1-20}$ alkoxy, $C_{6-20}$ aryl, $C_{7-20}$ arylalkenyl or —NR"$_2$ as defined above, e.g. —N($C_{1-20}$ alkyl)$_2$. More preferably each X is halide, particularly preferably Cl.

In preferred compounds of formula (II), $R^1$ and $R^{1'}$ are each independently $C_{1-20}$ hydrocarbyl groups and more preferably $C_{1-20}$ alkyl groups or $C_{6-20}$ aryl groups, still more preferably $C_{1-20}$ alkyl groups. Yet more preferably $R^1$ and $R^{1'}$ are $C_{1-10}$ alkyl groups and especially preferably $C_{1-6}$ alkyl groups. Most especially preferred hydrocarbyl groups are methyl, ethyl, propyl, isopropyl, n-butyl, tertbutyl, phenyl or benzyl.

In preferred compounds of formula (II), $R^2$, $R^{2'}$, $R^3$, $R^{3'}$, $R^4$, $R^{4'}$, $R^5$ and $R^{5'}$ are each independently H.

In preferred compounds of formula (II) X is H, halogen, $C_{1-20}$ alkyl, $C_{1-20}$ alkoxy, $C_{2-20}$ alkenyl, $C_{2-20}$ alkynyl, $C_{3-12}$-cycloalkyl, $C_{6-20}$ aryl, $C_{6-20}$ aryloxy, $C_{7-20}$ arylalkyl, $C_{7-20}$ arylalkenyl, —SR", —PR"$_3$, —SiR"$_3$, —OSiR"$_3$, —NR"$_2$ or —CH$_2$—Y, wherein Y is $C_{6-20}$ aryl, $C_{6-20}$ heteroaryl, $C_{1-20}$ alkoxy, $C_{6-20}$ aryloxy, NR"$_2$, —SR", —PR"$_3$, —SiR"$_3$, or —OSiR"$_3$ and wherein each R" is independently a hydrogen or hydrocarbyl, e.g. $C_{1-20}$ alkyl, $C_{2-20}$ alkenyl, $C_{2-20}$ alkynyl, $C_{3-12}$ cycloalkyl or $C_{6-20}$ aryl; or e.g. in case of —NR"$_2$, the two substituents R" can form a ring, e.g. five- or six-membered ring, together with the nitrogen atom to which they are attached. Preferably X is halogen, $C_{1-20}$ alkyl, $C_{1-20}$ alkoxy, $C_{6-20}$ aryl, $C_{7-20}$ arylalkenyl or —NR"$_2$ as defined above, e.g. —N($C_{1-20}$ alkyl)$_2$. More preferably each X is halide, particularly preferably Cl.

A more preferred subgroup of metallocenes are those of formula (III):

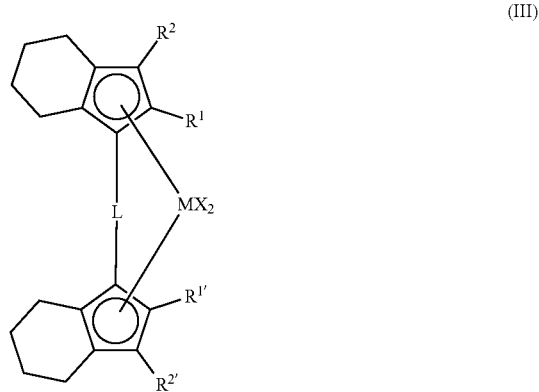

wherein
M is a transition metal of Group 4 to 6, such as Group 4, e.g. Ti, Zr or Hf, especially Zr or Hf and particularly Zr
each X is independently a sigma-ligand, preferably halogen, $C_{1-20}$ alkyl, $C_{1-20}$ alkoxy, $C_{6-20}$ aryl, $C_{7-20}$ arylalkenyl or —NR"$_2$ as defined above, e.g. —N($C_{1-20}$ alkyl)$_2$;
$R^1$, $R^{1'}$ $R^2$, $R^{2'}$, are each independently H or a $C_{1-20}$ hydrocarbyl (e.g. $C_{1-20}$ hydrocarbyl group such as $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl, $C_{7-20}$ alkylaryl or $C_{7-20}$ arylalkyl); and
L is a bridge of 1-4 C-atoms and 0-4 heteroatoms, wherein the heteroatom(s) can be e.g. Si, Ge and/or O atom(s), wherein each of the bridge atoms may bear independently substituents, such as $C_{1-20}$ alkyl, tri($C_{1-20}$ alkyl)silyl, tri($C_{1-20}$ alkyl)siloxy or $C_{6-20}$ aryl substituents); or a bridge of 1-3, e.g. one or two, hetero atoms, such as silicon, germanium and/or oxygen atom(s), e.g. —SiR'''$_2$-, wherein each R''' is independently $C_{1-20}$ alkyl, $C_{3-12}$ cycloalkyl, $C_{6-20}$ aryl or tri($C_{1-20}$ alkyl)silyl residue, such as trimethylsilyl.

In preferred compounds of formula (III) M is a Group 4 transition metal, e.g. Ti, Zr or Hf, especially Zr or Hf and particularly Zr.

In preferred compounds of formula (III) X is preferably H, halogen, $C_{1-20}$ alkyl, $C_{1-20}$ alkoxy, $C_{2-20}$ alkenyl, $C_{2-20}$ alkynyl, $C_{3-12}$-cycloalkyl, $C_{6-20}$ aryl, $C_{6-20}$ aryloxy, $C_{7-20}$ arylalkyl, $C_{7-20}$ arylalkenyl, —SR", —PR"$_3$, —SiR"$_3$, —OSiR"$_3$, —NR"$_2$ or —CH$_2$—Y, wherein Y is $C_{6-20}$ aryl, $C_{6-20}$ heteroaryl, $C_{1-20}$ alkoxy, $C_{6-20}$ aryloxy, NR"$_2$, —SR", —PR"$_3$, —SiR"$_3$, or —OSiR"$_3$ and wherein each R" is independently a hydrogen or hydrocarbyl, e.g. $C_{1-20}$ alkyl, $C_{2-20}$ alkenyl, $C_{2-20}$ alkynyl, $C_{3-12}$ cycloalkyl or $C_{6-20}$ aryl; or e.g. in case of —NR"$_2$, the two substituents R" can form a ring, e.g. five- or six-membered ring, together with the nitrogen atom to which they are attached. Preferably, X is halogen, $C_{1-20}$ alkyl, $C_{1-20}$ alkoxy, $C_{6-20}$ aryl, $C_{7-20}$ arylalkenyl or —NR"$_2$ as defined above, e.g. —N($C_{1-20}$ alkyl)$_2$. More preferably each X is halide, particularly preferably Cl.

In preferred compounds of formula (III), $R^1$, $R^{1'}$, $R^2$, $R^{2'}$ are each independently H.

In preferred compounds of formula (III), L is a methylene, ethylene or silyl bridge, whereby the silyl can be substituted as defined above, e.g. a (dimethyl)Si=, (methylphenyl)Si=, (methyylcyclohexyl)silyl= or (trimethylsilylmethyl)Si=. More preferably when L is present it is a methylene or ethylene bridge.

Particularly preferred metallocenes include (nBuCp)$_2$ZrCl$_2$, (Ind)$_2$ZrCl$_2$ and Et-(tetrahydroindenyl)$_2$ZrCl$_2$, (tetrahydroindenyl)$_2$ZrCl$_2$, Et-(Ind)$_2$ZrCl$_2$, (nBuCp)$_2$HfCl$_2$, (Ind)$_2$ HfCl$_2$ and Et-(tetrahydroindenyl)$_2$HfCl$_2$, (tetrahydroindenyl)$_2$HfCl$_2$ and Et-(Ind)$_2$HfCl$_2$. (nBuCp)$_2$HfCl$_2$, (Ind)$_2$ZrCl$_2$ and Et-(tetrahydroindenyl)$_2$ZrCl$_2$ are particularly preferred. Et-(tetrahydroindenyl)$_2$ZrCl$_2$ is especially preferred.

The preparation of the metallocenes can be carried out according or analogously to the methods known from the literature and is within the skills of a person skilled in the field. The ligands required to form the metallocenes of the invention can be synthesised by any process and the skilled organic chemist would be able to devise various synthetic protocols for the manufacture of the necessary ligands.

The catalyst is preferably produced without using fluorocarbon or fluorocarbonsurfactant.

Cocatalyst

In the process of the present invention a cocatalyst is preferably employed along with the metallocene catalyst. The cocatalyst may be, for example, aluminoxane, borane or borate. Preferably the cocatalyst is an aluminoxane cocatalyst. Preferably the aluminoxane is diluted in a $C_{3-10}$ saturated alkane or an aromatic hydrocarbon. More preferably the aluminoxane is diluted in a $C_{4-10}$ saturated alkane or toluene. The cocatalyst may be added to the reactor together with the metallocene catalyst or as a separate feed. Preferably a mixture of the aluminoxane and metallocene is diluted in a $C_{3-10}$ saturated alkane or an aromatic hydrocarbon and fed to the reactor. More preferably a mixture of the aluminoxane and metallocene is diluted in a $C_{4-10}$ saturated alkane or toluene and fed to the reactor. When the solvent is a $C_{3-10}$ saturated alkane preferably the solvent is selected from propane, isobutane, hexane and cyclohexane. When the solvent is a $C_{4-10}$ saturated alkane preferably the solvent is selected from hexane and cyclohexane.

The aluminoxane cocatalyst is preferably oligomeric. Preferably the aluminoxane cocatalyst is of formula (IV):

wherein
n is 1 to 20, more preferably 3 to 20 and still more preferably 6 to 20; and R is $C_{1-10}$ alkyl (preferably $C_{1-5}$ alkyl), $C_{3-10}$ cycloalkyl, $C_{7-12}$ aralkyl, $C_{7-12}$ alkaryl, phenyl or naphthyl.

Aluminoxanes are formed on partial hydrolysis of organoaluminum compounds, for example those of the formula $AlR_3$, $AlR_2Y$ and $Al_2R_3Y_3$ where R can be, for example, $C_{1-10}$ alkyl, preferably $C_{1-5}$ alkyl, $C_{3-10}$ cycloalkyl, $C_{7-12}$ aralkyl, $C_{7-12}$ alkaryl, phenyl or naphthyl, wherein Y is hydrogen, halogen (preferably chlorine or bromine), or $C_{1-10}$ alkoxy (preferably methoxy or ethoxy). The resulting oxygen-containing aluminoxanes are not in general pure compounds but mixtures of oligomers of the formula (IV).

Still more preferably the aluminoxane is a cage-like (e.g. multicyclic) molecule, e.g. with an approximate formula $(Al_{1-4}R_{0.8}O)_n$ where n is 10-60 and R is an alkyl group, e.g. a $C_{1-20}$ alkyl group. In preferred aluminoxanes R is a $C_{1-8}$ alkyl group, e.g. methyl.

Methylaluminoxane (MAO) is a mixture of oligomers with a distribution of molecular weights, preferably with an average molecular weight of 700 to 1500. MAO is a preferred aluminoxane for use in the catalyst system. Since the aluminoxanes used in the process of the invention as cocatalysts are not, owing to their mode of preparation, pure compounds, the molarity of aluminoxane solutions hereinafter is based on their aluminium content. The ratio of Al in the aluminoxane to the metal ion of the metallocene is preferably in the range 20:1 to 1000:1 mol/mol, preferably 50:1 to 500:1, especially 100:1 to 200:1 mol/mol.

The aluminoxane may be modified with an aluminium alkyl or aluminium alkoxy compound. Especially preferred modifying compounds are aluminium alkyls, in particular, aluminium trialkyls such as trimethyl aluminium, triethyl aluminium and tri isobutyl aluminium. Trimethyl aluminium is particularly preferred. Preferred metallocenes and cocatalysts of the present invention are not modified with an organoaluminium compound.

Aluminoxanes, such as MAO, that are suitable for the preparation of the catalyst systems herein described are commercially available, e.g. from Albemarle and Chemtura. It is also possible to generate the activator in situ, e.g. by slow hydrolysis of trimethylaluminium inside the pores of a carrier. This process is well known in the art.

General Multistage Polymerisation Process

The process of the present invention is a multistage polymerisation process. Preferably the process comprises two or three stages or steps and still more preferably two stages or steps. Preferably each stage or step of the multistage process is carried out in a different reactor. Preferably the process is semi-continuous or continuous. More preferably the process is continuous.

In the process of the present invention, each polymerisation stage may be carried out in slurry, supercritical or gas phase conditions. In preferred processes of the invention, however, at least the first polymerisation stage is carried out in slurry conditions. In further preferred processes of the invention, the second polymerisation stage is carried out in slurry, supercritical or gas phase conditions and more preferably in slurry conditions. In yet further preferred processes of the invention, the third polymerisation stage (when present) is carried out in slurry, supercritical or gas phase conditions and more preferably in slurry conditions.

Suitable polymerisation processes include, for example, Hostalen staged (where catalyst system and polymer sequentially pass from reactor to reactor) tank slurry reactor process for polyethylene by LyondellBasell, LyondellBasell-Maruzen staged tank slurry reactor process for polyethylene, Mitsui staged tank slurry reactor process for polyethylene by Mitsui, CPC single loop slurry polyethylene process by Chevron Phillips, Innovene staged loop slurry process by Ineos, Borstar staged slurry loop and gas phase reactor process for polyethylene by *Borealis* and Spheripol polypropylene staged slurry (bulk) loop and gas phase process by LyondellBasell.

The conditions for carrying out slurry polymerisations are well established in the art. The polymerisation is preferably carried out in conventional circulating loop or stirred tank reactors, preferably in stirred tank reactors.

The reaction temperature is preferably in the range 30 to 120° C., e.g. 50 to 100° C. The reaction pressure will preferably be in the range 1 to 100 bar, e.g. 5 to 70 bar or 2 to 50 bar. The total residence time in the reactors is preferably in the range 0.2 to 6 hours, e.g. 0.5 to 1.5 hours.

The diluent used for slurry polymerisations will generally be an aliphatic hydrocarbon having a boiling point in the range −70 to 100° C. The diluent is preferably a hydrocarbon of 3-10 carbon atoms. Preferably, it is n-hexane or isobutane. Most preferably, it is n-hexane.

The conditions for carrying out gas phase polymerisation are well established in the art. The polymerisation is preferably carried out in a conventional gas phase reactor such as a bed fluidised by gas feed or in a mechanically agitated bed, or in a circulating bed process.

The gas phase reaction temperature is preferably in the range 30 to 120° C., e.g. 50 to 100° C. The total gauge pressure is preferably in the range 1 to 100 bar, e.g. 10 to 40 bar. The total monomer partial pressure is preferably in the range 2 to 20 bar, e.g. 3 to 10 bar. The residence time in each gas phase reactor is preferably in the range 0.3 to 7 hours, more preferably 0.5 to 4 hours, still more preferably 0.7 to 3 hours, e.g. 0.9 to 2 hours.

Hydrogen is also preferably fed into the gas phase reactor to function as a molecular weight regulator. Preferably nitrogen is also fed into the gas phase reactor. It functions as a flushing gas.

Preferably a $C_{3-8}$ saturated hydrocarbon is also fed into the gas phase reactor. Particularly preferably a $C_{3-6}$ alkane (e.g. propane, n-butane) is fed into the reactor. It functions to increase heat transfer efficiency, thereby removing heat more efficiently from within the reactor.

Regardless of the polymerisation conditions, when present, the α-olefin comonomer is preferably an alpha olefin of 3-10 carbon atoms. Preferably, it is propylene, 1-butene, 1-pentene, 4-methyl-pentene-1, n-hexene or n-octene. In a slurry polymerisation if the diluent is n-hexane, then preferably the comonomer is propylene, 1-butene, 1-pentene or 4-methyl-pentene-1. More preferably, the comonomer is 1-butene or 1-pentene and most preferably it is 1-butene.

Hydrogen is preferably fed into at least one, and preferably all, of the reactors to function as a molecular weight regulator. Preferably the first polymerisation stage is carried out in the presence of hydrogen and particularly preferably in the presence of a relatively high level of hydrogen. The ratio of hydrogen and ethylene in the first reactor is preferably 0.1-10 mol/kmol and more preferably 0.2 to 4 mol/kmol. The second polymerisation stage may be carried out in the absence or presence of hydrogen. Any additional (e.g. third), polymerisation stage may be carried out in the absence or presence of hydrogen. When used in the second or additional (e.g. third) polymerisation stages, hydrogen is preferably present in a lower level than in the first polymerisation stage. When used in the second or additional (e.g. third) polymerisation stage, the ratio of hydrogen and ethylene is preferably 0 to 0.1:1 mol/kmol and more preferably 0 to 0.2:1 mol/kmol.

A significant advantage of using metallocene catalyst in polymerisation is that a very low amount of hydrogen in the reactor is required to produce the same polymer melt index compared to Ziegler Natta catalysts. This is due to high conversion of hydrogen by metallocene catalysts compared to Ziegler Natta catalysts. Especially in the first reactor stage, where high melt index is typically produced, very low partial pressure of hydrogen can be used with metallocene catalyst which enables use of increased ethylene pressure in reactor, thereby achieving higher production rate with low feed rate of catalyst, and thereby lowering catalyst cost. This is especially important in processes where low reactor total pressures are used (e.g. Hostalen, Mitsui CX).

Use of low level of hydrogen in the first reactor means also that only low level of hydrogen needs to be removed before the second reactor stage is started. Thus, use of metallocene catalyst means a cheap, simple operation for the hydrogen separation system (if needed at all) and low entrainment/losses of valuable materials like ethylene and the volatile slurry liquid.

In the process of the invention, a solution of unsupported metallocene catalyst and optionally cocatalyst (e.g. aluminoxane) in a solvent is initially prepared. Preferably a separate solution of cocatalyst (e.g. aluminoxane) in a solvent is prepared. Preferably a solution of unsupported metallocene catalyst in a solvent is employed. Preferably a solution of cocatalyst (e.g. aluminoxane) in a solvent is employed. Preferably the solvent for both solutions is a $C_{3-10}$ saturated alkane or an aromatic hydrocarbon. When the solvent is an aromatic hydrocarbon preferably the solvent is selected from toluene, benzene, ethylbenzene, propylbenzene, butylbenzene and xylene. Toluene is a preferred solvent. When the solvent is a $C_{3-10}$ saturated alkane preferably the solvent is selected from propane, isobutane, hexane and cyclohexane. When the solvent is a $C_{3-10}$ saturated alkane preferably the solvent is selected from a $C_{4-10}$ saturated alkane, more preferably hexane and cyclohexane. The solutions may each comprise one or more solvents. Preferably the same solvent is employed for both solutions.

In a preferred process of the invention, a first reactor is initially charged with diluent and hydrogen. The above described solutions (i.e. metallocene and optionally cocatalyst and cocatalyst respectively), ethylene and optionally α-olefin comonomer are then fed into the reactor. The cocatalyst may be added to the reactor together with the metallocene catalyst or as a separate feed. Preferably the polymer precipitates out of solution as it forms.

Preferably the polymerisation reactions are carried out as a continuous or semi-continuous process. Thus monomers, diluent and hydrogen are preferably fed continuously or semi-continuously into the reactor. Additionally the slurry from any previous reactor may be fed continuously or semi-continuously. Preferably the catalyst system, when a direct feed is required, is also fed continuously or semi-continuously into the reactor. Still more preferably polymer slurry is continuously or semi-continuously removed from the reactor. By semi-continuously is meant that addition and/or removal is controlled so they occur at relatively short time intervals compared to the polymer residence time in the reactor, e.g. between 20 seconds to 2 minutes, for at least 75% (e.g. 100%) of the duration of the polymerisation.

Preferably the concentration of polymer present in the reactor during polymerisation is in the range 15 to 55% wt based on total, e.g. slurry, more preferably 25 to 50% wt based on total, e.g. slurry. Such a concentration can be maintained by controlling the rate of addition of monomer, the rate of addition of diluent and catalyst system and, to some extent, the rate of removal of polymer e.g. polymer slurry from the, e.g. slurry reactor.

The catalyst employed in the process of the invention is unsupported and has a high activity. Preferably the catalyst activity is greater than 20,000 kg PE/(mol metal*h), more preferably greater than 40,000 kg PE/(mol metal*h) and still more preferably greater than 60,000 kg PE/(mol metal*h). Without wishing to be bound by theory, this is thought to be due to the greater access of the active site of the catalyst to the ethylene and comonomers which results in a higher concentration of monomers in the active site of the catalyst. Economically these advantages are significant versus the use of supported catalysts.

Preferably no reactor fouling occurs in the process of the invention. One shortcoming of many polymerisation processes is the tendency of the reactor to become fouled. The fouling, as used herein, denotes the phenomenon that particles of the polymerization product or particles of the solid catalyst in the slurry or gas phase deposit on the walls of a reactor. Particles may also deposit on other reactor surfaces, including impeller, process equipment, etc. The accumulation of particles on the reactor walls results in various problems including reduced heat transfer, reduced polymer production rate and decreased ability to control the process. Generally in the slurry polymerization, a tank or loop reactor equipped with a stirrer is used. When fouling occurs, the smoothness of the wall surface of the reactor is lost and the power used for stirring is drastically increased; at the same time, the heat transfer through the reactor wall is reduced. The result is a failure of temperature control, and in the worst case, the reaction can run out of control. Once fouling has proceeded, it is very difficult to remove the deposit during continuous operation, and in many cases, the reactor does not regain its normal state unless cleaned after disassembling. In the end the reactor fouling will lead to a situation where the commercial operation has to be stopped and the reactor has to be shut down. Before restarting can happen, the reactor has to be cleaned, not only on the reactor surfaces but also including impellers, heat exchangers and other process equipment. Fouling can also damage the reactor pumps, gearboxes and valves. The stoppage of the commercial production, maintenance, cleaning and restarting can take several days and is a very time consuming and expensive process.

Preferably there is no reactor fouling in the first polymerisation stage. Preferably this manifests in the production of a first ethylene polymer having a bulk density of 100 to 200 g/dm³. Preferably the ethylene polymer from the first polymerisation stage is in the form of free flowing particles. Preferably there is no reactor fouling in the second or later polymerisation stages. This manifests in the production of a multimodal polyethylene having a bulk density of at least 250 g/dm³, e.g. 250-400 g/cm³. This is highly beneficial as the multimodal polyethylene particles with good morphology are facile to handle and to process by extrusion in the manufacture of pipes. It is, however, also highly surprising because reactor fouling is commonplace with the use of unsupported metallocene catalysts, generally due to inferior polymer morphology. Without wishing to be bound by theory the absence of reactor fouling is thought to be due to preferable production of homopolymer and controlled use of hydrogen in the first polymerisation stage. The production of homopolymer with higher melting point compared to ethylene copolymer and production of low molecular weight polyethylene in controlled molecular weight range in the first stage reactor are believed to be the key factors to be able to avoid fouling also in the later stages.

Preferably the first polymerisation stage produces a lower molecular weight ethylene (LMW) polymer. Preferably the first polymerisation stage produces a homopolymer. Preferably the second polymerisation stage produces a higher molecular weight ethylene (HMW) polymer. Preferably the second polymerisation stage produces a copolymer.

First Preferred Process

A preferred process of the invention consists of a first polymerisation stage and a second polymerisation stage. In such a process the first polymerisation stage preferably produces 1 to 65% wt, more preferably 10 to 60% wt and still more preferably 30 to 55% wt of the multimodal polyethylene. In such a process the second polymerisation stage preferably produces 35 to 99% wt, more preferably 40 to 85% wt and still more preferably 45 to 70% wt of the multimodal polyethylene.

In a preferred process the first reactor is preferably fed with catalyst, ethylene, optionally α-olefin and hydrogen. Diluent is also fed. Preferably essentially the catalyst for all of the reactors is fed to the first reactor.

The conditions used for polymerisation, and especially hydrogen and comonomer levels in the reactor, depend on the metallocene catalyst type used. The skilled man will be able to make any necessary modifications. Preferably, however, the conditions for carrying out the polymerisation in the first reactor are generally as follows:

Temperature: 50 to 270° C., more preferably 60 to 120° C., still more preferably 50 to 100° C., yet more preferably 70 to 90° C.

Pressure: 1 to 220 bar, preferably 1 to 60 bar, more preferably 1 to 35 bar, still more preferably 5 to 15 bar (if hexane is used) and 15 to 35 bar (if isobutane is used)

Partial pressure of ethylene: 1-200 bar, preferably 1-15 bar, more preferably 1-10 bar, still more preferably 2-10 bar Residence time: 1 minute to 6 hours, preferably 10 minutes to 4 hours, more preferably 15 minutes-1 hour Diluent/solvent: $C_{4-10}$ saturated alkane, preferably hexane or isobutane as diluent Hydrogen in reactor ($H_2$:ethylene, mol/kmol): 0.1:1 to 10:1, preferably 0.2:1 to 4:1 Comonomer in reactor (comonomer:ethylene, mol/kmol): 0 to 50:1, preferably 0 to 10:1, more preferably 0.

Preferably the optional comonomer is 1-butene or 1-hexene.

The flow out of first reactor is directed to the second reactor. The most volatile components are preferably removed from the outgoing flow of the first reactor such that more than 80% of the hydrogen, more preferably at least 90% of the hydrogen and more preferably substantially all of the hydrogen, is removed before the flow enters the second reactor.

The second reactor is fed with ethylene and optionally α-olefin comonomer. Hydrogen is preferably present at a lower level than in the first reactor or absent. Preferably the conditions for carrying out the polymerisation in the second reactor are as follows:

Temperature: 50 to 290° C., preferably 50 to 100° C., more preferably 60 to 100° C., still more preferably 70 to 90° C.

Pressure: 1 to 200 bar, preferably 1 to 60 bar, more preferably 1 to 15 bar, still more preferably 2 to 15 bar, yet more preferably 2 to 10 bar, e.g. 5 to 15 bar (if hexane is used) and 15 to 35 bar (if isobutane is used)

Partial pressure of ethylene: 0.2-200 bar, preferably 0.5 to 15 bar, more preferably 0.5-10 bar, e.g. 0.7 to 8 bar Residence time: 1 minute to 4 hours, preferably 10 minutes to 4 hours, more preferably 15 minutes to 2 hours, yet more preferably 15 minutes-1 hour Diluent/solvent: $C_{4-10}$ saturated alkane, preferably hexane or isobutane as diluents.

Hydrogen in reactor ($H_2$:ethylene, mol/kmol): 0 to 1:1, preferably 0 to 0.2:1

Comonomer in reactor (comonomer:ethylene, mol/kmol): 0.1:1 to 200:1, preferably 2:1 to 50:1

Preferably the optional comonomer is 1-butene or 1-hexene. Preferably $H_2$ is absent.

Second Preferred Process

A further preferred process of the invention consists of a first polymerisation stage, a second polymerisation stage and a third polymerisation stage. Preferably the third polymerisation is carried out in slurry conditions. Preferably the first polymerisation produces a homopolymer. Preferably the second and/or third polymerisation produces a copolymer. Preferably the second and third polymerisation is carried out in the presence of a lower amount of hydrogen than the first polymerisation stage or in absence of hydrogen. Preferably there is no reactor fouling in the second and/or third polymerisation stage.

One preferred three stage polymerisation comprises sequential steps (a)-(c):

(a) polymerising ethylene and optionally an α-olefin comonomer in a first polymerisation stage to produce a lower molecular weight ethylene (LMW) polymer;

(b) polymerising ethylene and optionally an α-olefin comonomer in a second polymerisation stage to produce a first higher molecular weight ethylene polymer (HMW1); and (c) polymerising ethylene and optionally an α-olefin comonomer in a third polymerisation stage to produce a second higher molecular weight ethylene copolymer (HMW2).

In a preferred process of the invention, the multimodal polyethylene is prepared by preparing its ethylene polymer components in sequence from lowest molecular weight to highest molecular weight, i.e. the molecular weight of the components increases in the order LMW<HMW1<HMW2. In a further preferred process of the invention, the multimodal polyethylene is prepared by preparing its ethylene polymer components in sequence from lowest comonomer content to highest comonomer content, i.e. the comonomer content of the components increases in the order LMW<HMW1<HMW2. In this latter case the LMW polymer will generally also be the lowest molecular weight polymer, but either of HMW1 or HMW2 may be the highest molecular weight polymer. Preferably HMW2 has the highest comonomer content and the highest molecular weight.

In a preferred process, during the polymerisation to produce a first higher molecular weight ethylene polymer, at least some of the lower molecular weight ethylene polymer is present in the second reactor. In a further preferred process only a portion of the lower molecular weight ethylene polymer is present in the second reactor. Preferably the other portion of the lower molecular weight ethylene polymer is transferred directly to the polymerisation of the second higher molecular weight ethylene polymer in the third reactor. In a particularly preferred process, during the polymerisation to produce a second higher molecular weight ethylene polymer, the lower molecular weight ethylene polymer and the first higher molecular weight ethylene polymer, are present in the third reactor.

In this preferred process essentially all of the catalyst used in the reactors is preferably fed to first (LMW) reactor. The first reactor is also preferably fed with ethylene, optionally α-olefin and hydrogen. Diluent is also fed. Preferably the conditions for carrying out the polymerisation in the first reactor are as follows:

Temperature: 50 to 270° C., more preferably 60 to 120° C., still more preferably 50 to 100° C., yet more preferably 70 to 90° C.

Pressure: 1 to 220 bar, preferably 1 to 60 bar, more preferably 1 to 35 bar, still more preferably 5 to 15 bar (if hexane is used) and 15 to 35 bar (if isobutane is used)

Partial pressure of ethylene: 1-200 bar, preferably 1-15 bar, more preferably 1-10 bar, still more preferably 2-10 bar Residence time: 1 minute to 6 hours, preferably 10 minutes to 4 hours, more preferably 15 minutes-1 hour Diluent/solvent: $C_{4-10}$ saturated alkane, preferably hexane or isobutane as diluent Hydrogen in reactor ($H_2$:ethylene, mol/kmol): 0.1:1 to 10:1, preferably 0.2:1 to 4:1.

Comonomer in reactor (comonomer:ethylene, mol/kmol): 0 to 50:1, preferably 0 to 10:1, more preferably 0.

Preferably the optional comonomer is 1-butene or 1-hexene.

The polymerisation in the first reactor preferably produces 30-70% wt of the total multimodal polyethylene, more preferably 35-65% wt, still more preferably 40-60% wt and most preferably 45-55% wt.

The flow out of first (LMW) reactor is preferably directed to the second reactor. Preferably 100% of flow goes to the second reactor. The most volatile components are preferably removed from the outgoing flow of the first reactor such that more than 80% of the hydrogen, more preferably at least 90% of the hydrogen and still more preferably 100% of the hydrogen, is removed before the flow enters the second reactor.

The second reactor is fed with ethylene and optionally α-olefin comonomer. Hydrogen is optionally fed into the second reactor. Diluent is also preferably fed into the second reactor. Preferably the conditions for carrying out the polymerisation in the second reactor are as follows:

Temperature: 50 to 290° C., preferably 50 to 100° C., more preferably 60 to 100° C., still more preferably 70 to 90° C.

Pressure: 1 to 200 bar, preferably 1 to 60 bar, more preferably 1 to 15 bar, still more preferably 2 to 15 bar, yet more preferably 2 to 10 bar, e.g. 5 to 15 bar (if hexane is used) and 15 to 35 bar (if isobutane is used)

Partial pressure of ethylene: 0.2-200 bar, preferably 0.5 to 15 bar, more preferably 0.5-10 bar, e.g. 0.7 to 8 bar Residence time: 1 minute to 4 hours, preferably 10 minutes to 4 hours, more preferably 15 minutes to 2 hours, yet more preferably 15 minutes-1 hour Diluent/solvent: $C_{4-10}$ saturated alkane, preferably hexane or isobutane as diluent.

Hydrogen in reactor ($H_2$:ethylene, mol/kmol): 0 to 1:1, preferably 0 to 0.2:1

Comonomer in reactor (comonomer:ethylene, mol/kmol): 0.1:1 to 200:1, preferably 1:1 to 20:1

Preferably the optional comonomer is 1-butene or 1-hexene.

In the second reactor, 30-70% wt of the total multimodal polyethylene is preferably made, more preferably 35-65% wt, still more preferably 40-60% wt and most preferably 40-50% wt.

Essentially all of the flow out of second reactor is preferably fed into the third reactor. Any hydrogen is preferably removed. To the third reactor is fed ethylene and optionally α-olefin comonomer. Hydrogen is also optionally fed to the third reactor. Diluent is additionally preferably fed to the third reactor. Preferably the conditions for carrying out the polymerisation in the third reactor are as follows:

Temperature: 50 to 320° C., more preferably 50 to 100° C., still more preferably 60 to 100° C., yet more preferably 70 to 90° C.

Pressure: 0.5 to 220 bar, more preferably 1 to 60 bar, still more preferably 1 to 10 bar, preferably 1.5 to 7 bar, still more preferably 5 to 15 bar (if hexane is used) and 15 to 35 bar (if isobutane is used)

Partial pressure of ethylene: 0.2 to 200 bar, more preferably 0.25 to 10 bar, still more preferably 0.3-4 bar Residence time: 0.2 minutes to 2 hours, preferably 2 minutes to 1 hour, more preferably 5 to 30 minutes Diluent/solvent: $C_{4-10}$ saturated alkane, preferably hexane or isobutane as diluent Hydrogen in reactor ($H_2$:ethylene, mol/kmol): 0 to 1:1, preferably 0 to 0.2:1

Comonomer in reactor (comonomer:ethylene, mol/kmol): 0.1:1 to 200:1, preferably 10:1 to 50:1

Preferably the optional comonomer is 1-butene or 1-hexene.

The molar ratio between α-olefin comonomer and ethylene in the third reactor is preferably 1.5-20 times, more preferably 2-15 times, and still more preferably 3-10 times higher, than the molar ratio between comonomer and ethylene in the second reactor.

In the third reactor, 0.5-30% wt of the total multimodal polyethylene is preferably made. Preferably at least 1.0% wt, e.g. 1.2% wt or 1.5% wt of the total multimodal polyethylene is made in the third reactor. Preferably less than 30% wt, e.g. 27% wt or 25% wt of the total multimodal polyethylene is made in the third reactor. Particularly preferably 1 to 25% wt, more preferably 1.5-15% wt and most preferably 1.5-9% wt of the total multimodal polyethylene is made.

Following polymerisation in the third reactor the multimodal polyethylene is preferably obtained by centrifugation or flashing.

Optionally, the polymerisation of the second and third reactor may be performed as polymerization in different zones with different polymerisation conditions within a single reactor shell. However, this is not preferred.

Third Preferred Process

In a further preferred process of the invention the multimodal polyethylene is prepared by preparing its ethylene polymer components in the sequence lower molecular weight ethylene polymer, second higher molecular weight ethylene copolymer and then first higher molecular weight ethylene copolymer.

This preferred process comprises the sequential steps (a)-(c):

(a) polymerising ethylene and optionally an α-olefin comonomer in a first reactor to produce a lower molecular weight ethylene polymer (LMW);

(b) polymerising ethylene and optionally an α-olefin comonomer in a second reactor to produce a second higher molecular weight ethylene copolymer (HMW2); and (c) polymerising ethylene and optionally an α-olefin comonomer in a third reactor to produce a first higher molecular weight ethylene copolymer (HMW1).

In this preferred process of the invention, the multimodal polyethylene is preferably prepared by preparing its ethylene polymer components in sequence lowest molecular weight, highest molecular weight and then second highest molecular weight (LMW/HMW2/HMW1), i.e. the molecular weight of the components increases in the order LMW<HMW1<HMW2. In a further preferred process of the invention, the multimodal polyethylene is prepared by preparing its ethylene polymer components in sequence lowest comonomer content, highest comonomer content and then second highest comonomer content, i.e. the comonomer content of the components increases in the order LMW<HMW1<HMW2. In this latter case the LMW polymer will generally also be the lowest molecular weight polymer, but either of HMW1 or HMW2 may be the highest molecular weight polymer. Preferably HMW2 has the highest comonomer content and the highest molecular weight.

This preferred process is shown in FIG. 1 which is discussed in more detail below.

In a preferred process, during the polymerisation to produce a second higher molecular weight ethylene polymer, at least some of the lower molecular weight ethylene polymer is present in the second reactor. In a further preferred process only a portion of the lower molecular weight ethylene polymer is present in the second reactor. Preferably the other portion of the lower molecular weight ethylene polymer is transferred directly to the polymerisation of the first higher molecular weight ethylene polymer in the third reactor. In a further preferred process, during the polymerisation to produce a first higher molecular weight ethylene polymer, the lower molecular weight ethylene polymer and the second higher molecular weight ethylene polymer, are present in the third reactor.

In this preferred process essentially all of the catalyst used in the reactors is preferably fed to the first reactor. To the first reactor is also preferably fed ethylene, hydrogen and optionally α-olefin comonomer. Diluent is also preferably fed to the first reactor. Preferably the conditions for carrying out the polymerisation in the first reactor are as follows:

Temperature: 50 to 270° C., more preferably 50 to 120° C., more preferably 50 to 100° C., still more preferably 70 to 90° C.

Pressure: 1 to 220 bar, preferably 1 to 70 bar, more preferably 3 to 20 bar, still more preferably 5 to 15 bar (if hexane is used) and 15 to 35 bar (if isobutane is used)

Partial pressure of ethylene: 0.2 to 200 bar, more preferably 0.5 to 15 bar, still more preferably 1-10 bar, e.g. 2-10 bar Residence time: 1 minute to 6 hours, preferably 10 minutes to 4 hours, more preferably 15 minutes-2 hours Diluent/solvent: $C_{4-10}$ saturated alkane, preferably hexane or isobutane as diluent Hydrogen in reactor ($H_2$:ethylene, mol/kmol): 0.1:1 to 10:1, preferably 0.2:1 to 4:1.

Comonomer in reactor (comonomer:ethylene, mol/kmol): 0 to 50:1, preferably 0 to 10:1, more preferably 0.

Preferably the optional comonomer is 1-butene, 1-pentene, 1-hexene or 1-octene and most preferably 1-butene or 1-hexene.

The polymerisation in the first reactor preferably produces 30-70% wt of the total multimodal polyethylene, more preferably 35-65% wt, still more preferably 40-60% wt and most preferably 45-55% wt.

Hydrogen is preferably removed from the flow out of the first reactor. The flow out of first reactor, e.g. after removing hydrogen, may all be transferred to the second reactor. More preferably however it is split between going directly to the third reactor and going via the second reactor. Preferably 5-100% of flow goes via the second reactor, more preferably 10-70%, most preferably 15-50%, for example 20-40%. Optionally unwanted compounds are removed from the flow. The most volatile components are preferably removed from the outgoing flow of the first reactor, e.g. such that more than 96% of the hydrogen is removed before the flow enters the second reactor and more than 80% of the hydrogen is removed before flow enters third reactor directly. The flow entering the second reactor and the flow entering the third reactor directly therefore comprises mainly polyethylene and diluent. Preferably substantially all (e.g. all) of the hydrogen is removed before the flow is split. The optional split may be achieved using control via mass flow measurements of, e.g. the slurry, and/or using volumetric feeders or switch flow between the second and third reactors in short sequences.

To the second reactor is fed ethylene and optionally α-olefin comonomer. Hydrogen is also optionally fed to the second reactor. A significant fraction of the comonomer feed is preferably nonpurified recycle stream from the third reactor.

Diluent is preferably fed to the second reactor. Preferably the conditions for carrying out polymerisation in the second reactor are as follows:

Temperature: 50 to 290° C., preferably 55 to 120° C., more preferably 50 to 100° C., e.g. 60 to 100° C., yet more preferably 70 to 90° C.

Pressure: 0.5 to 220 bar, preferably 0.75 to 70 bar, more preferably 1 to 50 bar, still more preferably 1 to 16 bar, e.g. 5 to 15 bar (if hexane is used) and 15 to 35 bar (if isobutane is used)

Partial pressure of ethylene: 0.2 to 200 bar, preferably 0.3 to 10 bar, more preferably 0.3-4 bar Residence time: 0.2 minutes to 1 hour, preferably 1 minute to 1 hour, preferably 2 to 20 minutes Diluent: Either absent (for gas phase) or $C_{4-10}$ saturated alkane, more preferably hexane or isobutane as diluents, and still more preferably hexane as diluent Hydrogen in reactor ($H_2$:ethylene, mol/kmol): 0 to 1:1, preferably 0 to 0.2:1 Comonomer in reactor (comonomer: ethylene, mol/kmol): 0.1:1 to 200:1, preferably 10:1 to 50:1

Preferably the optional comonomer is 1-butene, 1-pentene, 1-hexene or 1-octene and most preferably 1-butene or 1-hexene.

In the second reactor, 0.5-30% wt of the total multimodal polymer is preferably made. Preferably at least 1.0% wt, e.g. 1.2% wt or 1.5% wt of the total multimodal polyethylene is made in the second reactor. Preferably less than 30% wt, e.g. 27% wt or 25% wt of the total multimodal polyethylene is made in the second reactor. Particularly preferably 1 to 25% wt, more preferably 1.5-15% wt and most preferably 1.5-9% wt of the total multimodal polyethylene is made.

Essentially all of the polymer flow out of second reactor is preferably fed into the third reactor. This flow comprises mainly polyethylene and diluent. Optionally volatiles are partially removed from the flow before it enters the third reactor, e.g. volatile comonomer (e.g. 1-butene) may be removed from the flow. Any polymer flow out of the first reactor that does not enter the second reactor is also preferably fed into the third reactor.

To the third reactor is fed ethylene and optionally α-olefin comonomer. Optionally hydrogen is fed to the third reactor. Diluent or solvent is optionally fed to the third reactor. Preferably the major amount of the comonomer feed comes with the polymer from the second reactor. Preferably the conditions for carrying out the polymerisation in the third reactor are as follows:

Temperature: 50 to 320° C., preferably 50 to 120° C., more preferably 50 to 100° C. and still more preferably 70 to 90° C.

Pressure: 1 to 220 bar, preferably 1 to 70 bar, more preferably 1 to 50 bar, still more preferably 1 to 15 bar, and still more preferably 2 to 10 bar, e.g. 5 to 15 bar (if hexane is used) and 15 to 35 bar (if isobutane is used)

Partial pressure of ethylene: 0.4-200 bar, more preferably 0.5 to 15 bar, still more preferably 0.5-6 bar Residence time: 1 minute to 4 hours, preferably 0.5 to 4 hours, more preferably 1-2 hours Diluent: Either absent (for gas phase) or $C_{4-10}$ saturated alkane, more preferably hexane or isobutane as diluents, still more preferably hexane as diluent Hydrogen in reactor ($H_2$:ethylene, mol/kmol): 0 to 1:1, preferably 0 to 0.2:1

Comonomer in reactor (comonomer:ethylene, mol/kmol): 0.1:1 to 200:1, preferably 1:1 to 20:1

Preferably the optional comonomer is 1-butene, 1-pentene, 1-hexene or 1-octene and still more preferably 1-butene or 1-hexene The molar ratio comonomer/ethylene is preferably 5-90% of that in the second reactor, more preferably 10-40% of that in the second reactor.

In the third reactor, 30-70% wt of the total multimodal polymer is preferably made, more preferably 35-65% wt, still more preferably 40-60% wt and most preferably 40-50% wt.

Optionally a portion or part of the flow leaving the third reactor is recycled to the second reactor.

Following polymerisation in the third reactor the polyethylene is preferably obtained by centrifugation or flashing.

Multimodal Polyethylene

The final multimodal polyethylene for processing into articles such as pipes and films (e.g. blown film) will often contain additives such as carbon black and colourants as described below which are typically compounded into the polyethylene as a concentrated masterbatch after polyethylene synthesis is completed. The following details in relation to the polyethylene refer to the polyethylene per se and do not include any further additives unless explicitly stated.

The multimodal polyethylene preferably has a bimodal or trimodal molecular weight distribution. More preferably the multimodal polyethylene has a bimodal molecular weight distribution. The multimodality and broad molecular weight distribution of the polyethylene ensures that an attractive balance of polymer properties can be achieved. In particular it ensures that a high molecular weight polymer is achieved and hence makes the polyethylene suitable for pipe production. This is thought to be achieved because the unsupported catalyst provides easy access for ethylene to the active site of the catalyst which means that a high concentration of ethylene at the active site may be achieved. Preferably the multimodal polyethylene has a multimodal (e.g. bimodal or trimodal) composition.

The overall amount of ethylene monomer present in the multimodal polyethylene is preferably 50-99.9% wt, more preferably 50-99.5% wt, still more preferably 75-99.0% wt, e.g. 85 to 98% wt. Particularly preferably the overall amount of ethylene monomer in the multimodal polyethylene is 92-99.8% wt and more preferably 98 to 99.9% wt.

The total comonomer content of the multimodal polyethylene of the present invention is preferably 0.1-10% wt, still more preferably 0.2-5% wt and yet more preferably 0.3-3% wt. When it is stated herein that the amount of a given monomer present in a polymer is a certain amount, it is to be understood that the monomer is present in the polymer in the form of a repeat unit. The skilled man can readily determine what is the repeat unit for any given monomer. The comonomer is preferably one or more (e.g. one) α-olefin. Particularly preferably the comonomer is selected from propylene, 1-butene, 1-pentene, 4-methyl-1-pentene, 1-hexene, 1-octene and mixtures thereof. Preferably, however, the α-olefin is 1-butene.

A significant advantage of using metallocene catalyst in copolymerisation, specifically to produce polyethylene pipe, is that homogeneous comonomer incorporation in the polymer is obtained compared to Ziegler Natta and chromium catalysts. The improved comonomer incorporation property with metallocenes significantly enhances, for example, slow crack growth and rapid crack propagation behaviour of the polymer which has crucial impact on the polyethylene pipe properties.

The weight average molecular weight (Mw) of the multimodal polyethylene of the present invention is preferably at least 50,000 g/mol, more preferably 100,000-250,000 g/mol, still more preferably 130,000-225,000 g/mol and yet more preferably 140,000-200,000 g/mol. The Mn (number average molecular weight) of the multimodal polyethylene is preferably 18,000-40,000 g/mol, still more preferably 20,000-35,000 g/mol and yet more preferably 20,000-30,000 g/mol. The molecular weight distribution (MWD) of the multimodal polyethylene is preferably 1 to 25, more preferably 2 to 15 and still more preferably 5 to 10. These advantageous properties, especially the ability to produce high Mw, enable production of multimodal polyethylene pipe according to present invention.

The multimodal polyethylene preferably has a $MFR_2$ of less than 0.2 g/10 min. Still more preferably the multimodal polyethylene has a $MFR_2$ of 0.005-0.2, more preferably 0.0075-0.2, still more preferably 0.01 to 0.1 and yet more preferably 0.015 to 0.05 g/10 min. The multimodal polyethylene preferably has a $MFR_5$ of less than 1 g/10 min. Still more preferably the multimodal polyethylene has a $MFR_5$ of 0.05 to 1, more preferably 0.01 to 0.9, still more preferably 0.1 to 0.8 and yet more preferably 0.3 to 0.75 g/10 min. This is an acceptable range of production of pipes, i.e. it ensures that the polyethylene may be extrusion moulded. These MFR values are significantly lower than the MFRs of polyethylenes produced using a supported version of an otherwise identical catalyst.

The multimodal polyethylene preferably has a melting temperature of 120-135° C., still more preferably 125-133° C. and yet more preferably 127-132° C.

The multimodal polyethylene preferably has a density of 920 to 980 kg/dm$^3$. More preferably the multimodal polyethylene is a high density polyethylene (HDPE). HDPE has the advantage of having a relatively low inherent weight, yet high mechanical strength, corrosion and chemical resistance and long-term stability. Preferably the multimodal polyethylene has a density of 920-970 kg/m$^3$, more preferably 935-963 kg/m$^3$, still more preferably 940-960 kg/m$^3$ and yet more preferably 945-955 kg/m$^3$. The multimodal polyethylene, preferably in form of powder, preferably has a bulk density of 250 to 400 g/dm$^3$, more preferably 250 to 350 g/dm$^3$ and still more preferably 250 to 300 g/dm$^3$. Alternatively, the multimodal polyethylene, preferably in form of powder, preferably has a bulk density of at least 250 g/dm$^3$, more preferably at least 300 g/dm$^3$.

The multimodal polyethylene of the present invention preferably has an ash content of 0 to 800 wt ppm, more preferably 0 to 600 wt ppm, still more preferably 0 to 400 wt ppm. Ash is typically metal oxides which derive from the catalyst, cocatalyst and polymer additives. With supported metallocene catalysts, typically silica or other related inorganic carriers are used. Also, the supported metallocene catalysts typically suffer from low polymerisation activity. The use of carriers combined with low polymerisation activity lead to high ash content and high local heterogeneities in the polymer. When unsupported catalysts described in the present application are used, significantly lower ash content and local heterogeneities in the polymer are obtained.

Ash is produced by heating the polymer comprising remnants of catalyst, cocatalyst and catalyst additives to high temperatures. Thus, ash level is significantly increased e.g. by use of carrier in the catalyst. Unfortunately the ash which forms can impact on the properties of polymer. Increased ash level gives increase to local heterogeneities in the polymer structure which often lead to mechanical failures in the pipe, meaning cracks and breakages, which deteriorates especially the slow crack growth properties of the pipe. They also affect the pipe appearance and performance by introducing roughness on the inner and outer surface which has effect e.g. on the flowability of liquids. Also, high ash content has effect on the electrical properties of the polymer leading to higher conductivity.

The multimodal polyethylene of the present invention preferably contains less than 100 wt ppm of material of hardness more than 3 on Moh's scale, more preferably 50-4, preferably 20-5, and most preferably less than 10 wt ppm of a material with hardness on Moh's scale of more than 6. Moh's scale is a practical scale to determine which material scratches which. Silica is a hard material, having a hardness of 7.0 on Moh's scale. The material with the higher Moh's hardness will scratch the material with the lower Moh's hardness. Since typical steel grades are 4.0-4.5 on this scale, silica will scratch steel. Silica particles present in polyethylene will therefore scratch the metal surfaces of polymer melt handling equipment which over time results in the equipment getting worn and eventually needing replacement. Silica is typically used as a carrier in supported metallocene catalysts and thus remains in the polymer produced by processes using supported metallocenes.

The multimodal polyethylene of the present invention preferably does not contain silica. It may, however, contain a small amount of aluminium based residues. However, this will be present as minute particles of $Al(OH)_3$ ($Al_2O_3.3H_2O$). This compound is not hard. Its hardness on Moh's scale is only 3.0. Therefore, it will not scratch the metal surfaces of melt handling equipment and wear will be reduced to a minimum.

Bimodal and trimodal polyethylene grades require high intensity melt mixing to become homogeneous. Thus, the bimodal and trimodal grades have a particularly high need for polymer without particles giving scratching and thereby wear. Thus, multimodal polyethylene has a particular need for low silica content.

The multimodal polyethylene of the present invention is preferably produced without using fluorocarbon or fluorocarbonsurfactant. The multimodal polyethylene of the present invention preferably has a fluorocarbon and fluorocarbyl content of less than 20 wtppm, more preferably less than 15 wtppm, even more preferably less than 10 wtppm and most preferably less than 5 wtppm. This is advantageous as there is an increasing concern over environmental and health aspects of the persistent and bioaccumulating fluorosurfactants. There are also similar concerns over fluorocarbons.

First ethylene polymer produced in first stage of polymerisation (all polymerisation processes)

The first ethylene polymer is a metallocene polymer, i.e. it is prepared by metallocene catalysed polymerisation.

The first ethylene polymer present in the multimodal polyethylene may be an ethylene homopolymer or ethylene copolymer. Preferred copolymers comprise one or more (e.g. one) α-olefin comonomers. Preferred α-olefin comonomers are selected from propylene, 1-butene, 1-pentene, 4-methyl-1-pentene, 1-hexene, 1-octene and mixtures thereof. Preferably the α-olefin is 1-butene. Preferably, however, the first ethylene polymer is an ethylene homopolymer.

Preferably the first ethylene polymer is a lower molecular weight polymer than the second and if present third ethylene polymers.

The weight average molecular weight (Mw) of the first ethylene polymer is preferably 10,000-80,000 g/mol, still more preferably 15,000-60,000 g/mol and yet more preferably 20,000-45,000 g/mol, e.g. 25,000-40,000 g/mol. The Mn of the first ethylene polymer is preferably 5,000-40,000 g/mol, still more preferably 7,000-20,000 g/mol and yet more preferably 8,000-15,000 g/mol, e.g. 10,000 g/mol. The MWD (Mw/Mn) of the first ethylene polymer is preferably 1.8-5, still more preferably 2.0-4 and yet more preferably 2.3-3.5.

Preferably the first ethylene polymer has a $MFR_2$ of at least 10 g/10 min, more preferably 10-1000 g/10 min, still more preferably 50-600 g/10 min, yet more preferably 150-500 g/10 min and yet more preferably 250-350 g/10 min. Alternatively the first ethylene polymer preferably has a $MFR_2$ of 100-300 g/10 min.

Preferably the first ethylene polymer has a density of 960-975 $kg/m^3$, more preferably 965-974 $kg/m^3$ and still more preferably 969-972 $kg/m^3$.

The first ethylene polymer preferably has a melting temperature of 128-135° C., still more preferably 130-134.5° C. and yet more preferably 132-134° C.

The amount of the first ethylene polymer present in the multimodal polyethylene is preferably 1-65% wt, more preferably 10-60% wt, still more preferably 30-55% wt and yet more preferably 40-50% wt, wherein % wt is based on the weight of the polyethylene.

Second Ethylene Polymer Produced in Second Stage of Polymerisation (Two Stage Polymerisation Processes)

The second ethylene polymer is a metallocene polymer, i.e. it is prepared by metallocene catalysed polymerisation.

The second ethylene polymer present in the multimodal polyethylene may be an ethylene homopolymer or ethylene copolymer but is preferably an ethylene copolymer. Preferred copolymers comprise one or more (e.g. one) α-olefin comonomers. Preferred α-olefin comonomers are selected from propylene, 1-butene, 1-pentene, 4-methyl-1-pentene, 1-hexene, 1-octene and mixtures thereof. Preferably the α-olefin is 1-butene. Preferably the amount of α-olefin comonomer is 0.3 to 8% wt.

The weight average molecular weight (Mw) of the second ethylene polymer is preferably 150,000-700,000 g/mol, still more preferably 200,000-600,000 g/mol and yet more preferably 300,000-500,000 g/mol. The Mn of the second ethylene polymer is preferably 20,000-350,000 g/mol, still more preferably 50,000-200,000 g/mol and yet more preferably 80,000-150,000 g/mol. The MWD (Mw/Mn) of the second ethylene polymer is preferably 2-8 and still more preferably 2.5-5.

Preferably the second ethylene polymer has a $MFR_{21}$ of 0.3-4 g/10 min, still more preferably 0.5-3.5 g/10 min and yet more preferably 1 to 2.5 g/10 min. Preferably the second ethylene polymer has a $MFR_5$ of 0.02-0.04 g/10 min and still more preferably 0.025 to 0.035 g/10 min.

Preferably the second ethylene polymer has a density of 890-940 $kg/m^3$, more preferably 900-935 $kg/m^3$ and still more preferably 910-930 $kg/m^3$.

The amount of the second ethylene polymer present in the multimodal polyethylene is preferably 35-99% wt, more preferably 40-85% wt, still more preferably 45-70% wt and yet more preferably 50-60% wt, wherein % wt is based on the weight of the polyethylene.

HMW1 Polymer Produced in Three Stage Polymerisation Processes

The HMW1 polymer is a metallocene polymer, i.e. it is prepared by metallocene catalysed polymerisation.

The HMW1 polymer present in the multimodal polyethylene may be an ethylene homopolymer or ethylene copolymer but is preferably an ethylene copolymer. Preferred copolymers comprise one or more (e.g. one) α-olefin comonomers. Preferred α-olefin comonomers are selected from propylene, 1-butene, 1-pentene, 4-methyl-1-pentene, 1-hexene, 1-octene and mixtures thereof. Preferably the α-olefin is 1-butene. Preferably the amount of α-olefin comonomer is 0.3 to 2.5% wt.

The weight average molecular weight (Mw) of the HMW1 polymer is preferably 200,000-700,000 g/mol, still more preferably 250,000-600,000 g/mol and yet more preferably 300,000-500,000 g/mol. The Mn of the HMW1 polymer is preferably 25,000-350,000 g/mol, still more preferably 50,000-200,000 g/mol and yet more preferably 80,000-150,000 g/mol. The MWD (Mw/Mn) of the HMW1 polymer is preferably 2-8 and still more preferably 2.5-5.

Preferably the HMW1 polymer has a $MFR_{21}$ of 0.3-4 g/10 min, still more preferably 0.5-3.5 g/10 min and yet more preferably 1 to 2.5 g/10 min. Preferably the HMW1 polymer has a $MFR_5$ of 0.02-0.04 g/10 min and still more preferably 0.025 to 0.035 g/10 min.

Preferably the HMW1 polymer has a density of 890-930 kg/m$^3$, more preferably 900-925 kg/m$^3$ and still more preferably 910-920 kg/m$^3$.

The amount of the HMW1 polymer present in the multimodal polyethylene is preferably 30-70% wt, more preferably 35-65% wt, still more preferably 40-60% wt and yet more preferably 40-50% wt, wherein % wt is based on the weight of the polyethylene.

HMW2 Polymer Produced in Three Stage Polymerisation Processes

The HMW2 polymer is a metallocene polymer, i.e. it is prepared by metallocene catalysed polymerisation.

The HMW2 polymer present in the multimodal polyethylene may be an ethylene homopolymer or ethylene copolymer but is preferably an ethylene copolymer. Preferred copolymers comprise one or more (e.g. one) α-olefin comonomers. Preferred α-olefin comonomers are selected from propylene, 1-butene, 1-pentene, 4-methyl-1-pentene, 1-hexene, 1-octene and mixtures thereof. Preferably the α-olefin is 1-butene. Preferably the amount of α-olefin comonomer is 2 to 10% wt.

The weight average molecular weight (Mw) of the HMW2 polymer is preferably 300,000-1,000,000 g/mol, still more preferably 400,000-800,000 g/mol and yet more preferably 500,000-750,000 g/mol. The Mn of the HMW2 polymer is preferably 40,000-500,000 g/mol, still more preferably 50,000-300,000 g/mol and yet more preferably 70,000-250,000 g/mol. The MWD (Mw/Mn) of the HMW2 polymer is preferably 2-8 and still more preferably 2.5-5.

Preferably the HMW2 polymer has a $MFR_{21}$ of 0.0075-1 g/10 min.

Preferably the HMW2 polymer has a density of 890-925 kg/m$^3$, more preferably 900-920 kg/m$^3$ and still more preferably 905-915 kg/m$^3$.

The amount of the HMW2 polymer present in the multimodal polyethylene is preferably 0.5-30% wt, more preferably 1.0-25% wt, still more preferably 1.5-15% wt and yet more preferably 1.5-9% wt, wherein % wt is based on the weight of the polyethylene.

Downstream Processing

When the final multimodal polyethylene is obtained from a slurry reactor, the polymer is removed therefrom and the diluent preferably separated from it by flashing or filtration. The major part of the diluent and any unconverted comonomer is preferably recycled back to the polymerisation reactor (s). Preferably the polymer is then dried (e.g. to remove residues of liquids and gases from the reactor). Optionally the polymer is subjected to a deashing step, i.e. to washing with an alcohol, optionally mixed with a hydrocarbon liquid, or water. Preferably there is no deashing step.

In order that the polyethylene can be handled without difficulty, both within and downstream of the polymerisation process, the polyethylene from the reactors is preferably in a free-flowing state, preferably by having relatively large particles of high bulk density.

The polyethylene is preferably extruded and granulated into pellets. Preferably the processes from the polymerisation until the pelletisation extruder outlet are carried out under an inert (e.g. $N_2$) gas atmosphere.

Antioxidants are preferably added (process stabilisers and long term antioxidants) to the multimodal polyethylene. As antioxidant, all types of compounds known for this purpose may be used, such as sterically hindered or semi-hindered phenols, aromatic amines, aliphatic sterically hindered amines, organic phosphates and sulphur-containing compounds (e.g. thioethers). Other additives (antiblock, colour masterbatches, antistatics, slip agents, fillers, UV absorbers, lubricants, acid neutralisers and fluoroelastomer and other polymer processing agents) may optionally be added to the polymer.

If the multimodal polyethylene is to be used for the manufacture of pipe, a pigment (e.g. carbon black) is preferably added before extrusion. Pigments are preferably added in the form of a master batch.

Further additives (e.g. polymer processing agents or antiblock) may be added after pelletisation of the multimodal polyethylene. In this case the additives are preferably used as masterbatches and pellets mixed therewith before being, e.g. moulded into articles such as pipes.

Applications

The multimodal polyethylene obtainable by (e.g. obtained by) a process as hereinbefore defined forms a further aspect of the invention. Preferred properties of the multimodal polyethylene are as set out above in relation to the polymerisation process.

The metallocene multimodal polyethylene comprises:
i) a multimodal molecular weight distribution;
ii) a molecular weight of at least 100,000 g/mol;
iii) a $MFR_2$ of less than 0.2 g/10 min;
iv) a $MFR_5$ of less than 1 g/10 min;
v) a bulk density of at least 250 g/dm$^3$; and
vi) an ash content of less than 800 ppm wt.

Preferably the multimodal polyethylene has a Mw of 100,000-250,000 g/mol, still more preferably 130,000-225,000 g/mol and yet more preferably 140,000-200,000 g/mol.

Preferably the multimodal polyethylene has a Mn of 18,000 to 40,000 g/mol, more preferably 20,000 to 35,000 g/mol, and more preferably 20,000 to 30,000 g/mol.

Preferably the multimodal polyethylene has MWD of 1 to 25, preferably 2 to 15 and still more preferably 5 to 10.

Preferably the multimodal polyethylene has a $MFR_2$ of 0.005-0.2, more preferably 0.0075-0.2, still more preferably 0.01 to 0.1 and yet more preferably 0.015 to 0.05 g/10 min.

Preferably the multimodal polyethylene has a MFR$_5$ of 0.05 to 1, more preferably 0.01 to 0.9, still more preferably 0.1 to 0.8 and yet more preferably 0.3 to 0.75 g/10 min.

Preferably the multimodal polyethylene has a density of 920-970 kg/m$^3$, more preferably 935-963 kg/m$^3$, still more preferably 940-960 kg/m$^3$ and yet more preferably 945-955 kg/m$^3$.

Preferably the multimodal polyethylene, preferably in the form of powder, has a bulk density of 250 to 400 g/dm$^3$, more preferably 250 to 350 g/dm$^3$ and still more preferably 250 to 300 g/dm$^3$.

Preferably the multimodal polyethylene has an ash content of 0 to 800 wt ppm, more preferably 0 to 600 wt ppm and still more preferably 0 to 400 wt ppm.

Preferably the multimodal polyethylene contains less than 100 wtppm of material of hardness more than 3 on Moh's scale, more preferably 50-4, preferably 20-5, and most preferably less than 10 wtppm of a material with hardness on Moh's scale of more than 6.

Preferably the multimodal polyethylene has a fluorocarbon and fluorocarbyl content of less than 20 wtppm, more preferably less than 15 wtppm, even more preferably less than 10 wtppm and most preferably less than 5 wtppm.

The multimodal polyethylene is preferably used in extrusion and more preferably in pipe extrusion. A process for preparing a pipe comprises:
i) preparing a multimodal polyethylene by the process as hereinbefore defined; and
ii) extruding said multimodal polyethylene to produce pipe.

The multimodal polyethylene of the present invention may be used for extrusion or moulding (e.g. blow moulding or injection moulding). The multimodal polyethylene may therefore be used to make a wide range of articles including pipes, films and containers.

Preferably the multimodal polyethylene is used in pipe applications. Preferably it is used in HDPE pipes, e.g. according to PE80 or PE100 standards. The pipes may be used e.g. for water and gas distribution, sewer, wastewater, agricultural uses, slurries, chemicals etc.

Figure 2:
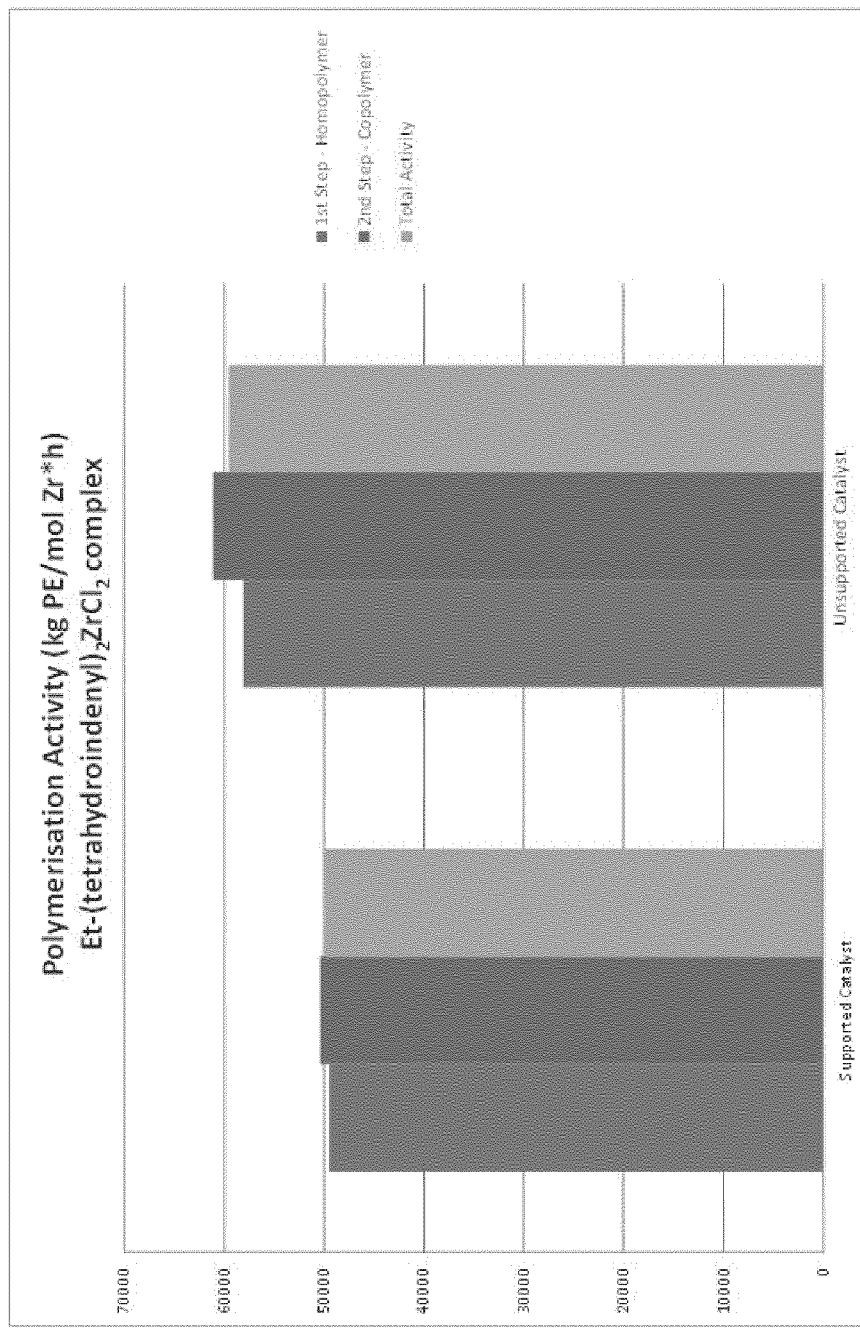
Figure 3:
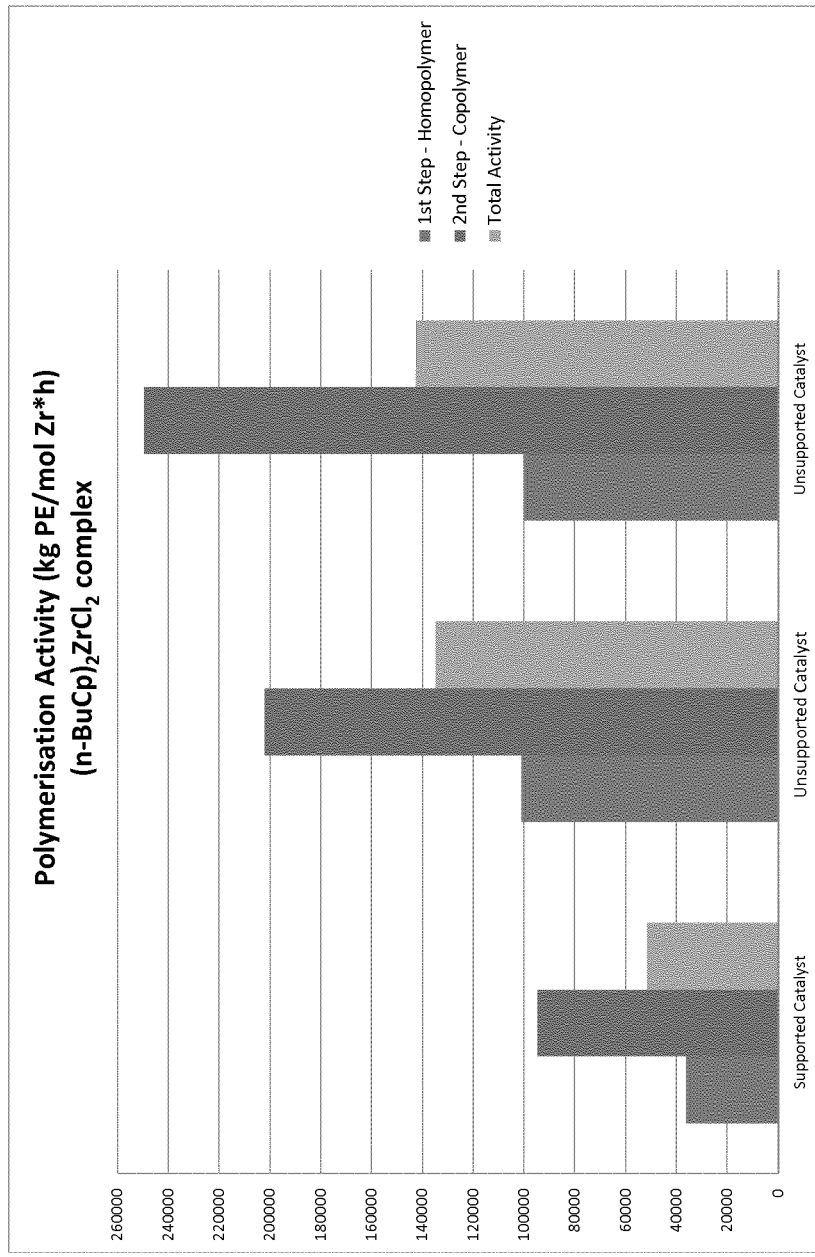
Figure 4B:
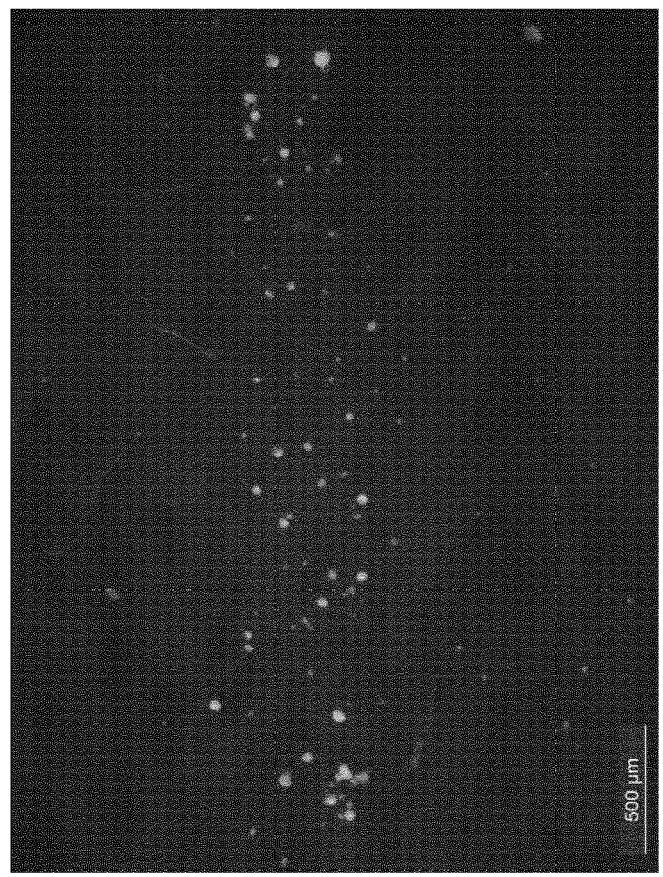
Figure 4A:
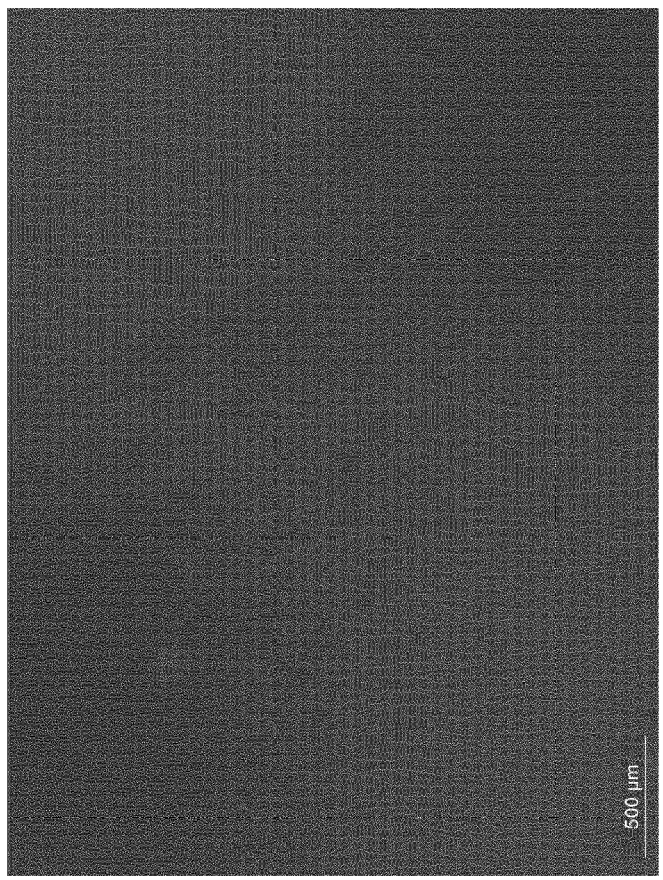

The invention will now be described with reference to the following non-limiting examples and Figures wherein:

FIG. 1 is a schematic of a process of the present invention;

FIG. 2 is a graph showing polymerisation activity for a process of the invention utilising unsupported rac-ethylene-bis(4,5,6,7-tetrahydro-1-indenyl)zirconium dichloride catalyst and a comparative process utilising a supported rac-ethylene-bis(4,5,6,7-tetrahydro-1-indenyl)zirconium dichloride catalyst; and FIG. 3 is a graph showing polymerisation activity for a process of the invention utilising unsupported bis-n-butyl-cyclopentadienylzirconium dichloride catalyst and a comparative process utilising a supported bis-n-butylcyclopentadienylzirconium dichloride catalyst FIG. 4A is a light microscopy picture of a pressed thin film sample of bimodal polyethylene produced by a bimodal polymerisation process of the invention utilising unsupported bis-n-butylcyclopentadienylzirconium dichloride catalyst FIG. 4B is a light microscopy picture of a pressed thin film sample of bimodal polyethylene produced by a comparative bimodal polymerisation process utilising a supported bis-n-butylcyclopentadienylzirconium dichloride catalyst

EXAMPLES

Determination Methods for Polymers

Unless otherwise stated, the following parameters were measured on polymer samples as indicated in the Tables below.

Melt indexes (MFR$_2$ and MFR$_5$) were measured according to ISO 1133 at loads of 2.16 and 5.0 kg respectively. The measurements were at 190° C.

Molecular weights and molecular weight distribution, Mn, Mw and MWD were measured by Gel Permeation Chromatography (GPC) according to the following method: The weight average molecular weight Mw and the molecular weight distribution (MWD=Mw/Mn wherein Mn is the number average molecular weight and Mw is the weight average molecular weight) is measured by a method based on ISO 16014-4:2003. A Waters Alliance GPCV2000 instrument, equipped with refractive index detector and online viscosimeter was used with 1 PLgel GUARD+3 PLgel MIXED-B and 1,2,4-trichlorobenzene (TCB, stabilised with 250 mg/l 2,6-Di tert butyl-4-methyl-phenol) as solvent at 160° C. and at a constant flow rate of 1 ml/min. 206 μl of sample solution were injected per analysis. The column set was calibrated using universal calibration (according to ISO 16014-2:2003) with 15 narrow molecular weight distribution polystyrene (PS) standards in the range of 0.58 kg/mol to 7500 kg/mol. These standards were from Polymer Labs and had Mw/Mn from 1.02 to 1.10. Mark Houwink constants were used for polystyrene and polyethylene (K: 0.19×10$^{-5}$ dl/g and a: 0.655 for PS and K: 3.9×10$^{-4}$ dl/g and a: 0.725 for PE). All samples were prepared by dissolving 0.5-3.5 mg of polymer in 4 ml (at 140° C.) of stabilised TCB (same as mobile phase) and keeping for 3 hours at 140° C. and for another 1 hour at 160° C. with occasional shaking prior to sampling into the GPC instrument.

Comonomer content (% wt) was determined based on Fourier transform infrared spectroscopy (FTIR) determination calibrated with C13-NMR.

Density of materials was measured according to ISO 1183:1987 (E), method D, with isopropanol-water as gradient liquid. The cooling rate of the plaques when crystallising the samples was 15° C./min. Conditioning time was 16 hours.

Rheology of the polymers was determined by frequency sweep at 190° C. under nitrogen atmosphere according to ISO 6721-10, using Rheometrics RDA II Dynamic Rheometer with parallel plate geometry, 25 mm diameter plate and 1.2 mm gap. The measurements gave storage modulus (G'), loss modulus (G") and complex modulus (G*) together with the complex viscosity (η*), all as a function of frequency (ω). These parameters are related as follows: For any frequency ω: The complex modulus: $G^*=(G'^2+G''^2)^{1/2}$. The complex viscosity: $\eta^*=G^*/\omega$. The denomination used for modulus is Pa (or kPa) and for viscosity is Pa s and frequency (1/s). $\eta^*_{0.05}$ is the complex viscosity at a frequency of 0.05 s$^{-1}$ and $\eta^*_{300}$ is the complex viscosity at 300 s$^{-1}$. According to the empirical Cox-Merz rule, for a given polymer and temperature, the complex viscosity as a function of frequency measured by this dynamic method is the same as the viscosity as a function of shear rate for steady state flow (e.g. a capillary).

The shear thinning index SHI (0.05/300) is defined as the ratio of the two viscosities eta0.05 ($\eta^*_{0.05}$) and eta300 ($\eta^*_{300}$).

Polymerisation activity (kg PE/mol metal*h) was calculated in each polymerisation stage based on polymer yield, molar level of the metallocene complex and residence time in the reactor.

Polymerisation productivity (kg PE/mol metal) was calculated in each polymerisation stage based on polymer yield and molar level of the metallocene complex.

Total activity and total productivity are based on the polymer yields and residence times in each reactor, taking also into account the polymer samples taken out of the reactor between the different stages.

As used herein, bulk density is measured on polymer powder. The bulk density of a powder (loose bulk density) is the ratio of the mass of an untapped powder sample and its volume (g/dm$^3$). The bulk density of a polymer powder was determined by measuring ca. 100 g of powder sample and let it flow freely through a funnel into a 100 ml cylinder with certified volume and measuring the powder weight.

Particle size of the polymer was analysed from the dry powder by using Malvern Mastersizer 2000.

For particle size distributions the median is called the d50. The d50 has been defined as the diameter where half of the population lies below this value. Similarly, 90 percent of the distribution lies below the d90, and 10 percent of the population lies below the d10.

Ash content of the polymer samples was measured by heating the polymer in a microwave oven at 650° C. during 20 minutes according to ISO 3451-1.

The foreign particle content of the polymer samples was analysed using light microscopy (Leica MZ16a; Contrast mode: Transmitted light/dark field) on the pressed thin film sample. The samples were prepared by melting one gram of the polymer powder and hot-pressing it to a film between two Mylar sheets, with thickness approx. 200 μm. The quantification of the foreign particles was done by image analysis on the pressed thin film samples (3.3×2.5 mm).

Al/Me is the ratio in the polymerisation (mol/mol) of aluminium in the aluminoxane to the metal ion (e.g. Zr) of the metallocene. The aluminium level is calculated from MAO and the metal level from the metallocene complex.

Experiments and Results

Experimental

The following unsupported single site catalyst was used in the polymerisations:
SSC 1: rac-ethylene-bis(4,5,6,7-tetrahydro-1-indenyl)zirconium dichloride (Mw=426.2 g/mol; commercially available from MCAT, Germany).
SSC 2: bis-n-butylcyclopentadienyl zirconium dichloride (Mw=404.2 g/mol; commercially available from STREM, Germany).

As a reference, two supported single site catalysts were used. The catalysts were:
comparative catalyst 1: supported rac-ethylene-bis(4,5,6,7-tetrahydro-1-indenyl)zirconium dichloride metallocene complex (Zr level 0.2% wt). This catalyst was synthesised according to U.S. Pat. No. 6,291,611;
comparative catalyst 2: supported bis-n-butylcyclopentadienyl zirconium dichloride metallocene complex (Zr level 0.2% wt). This catalyst was synthesised according to WO93/023439. This is the same catalyst used in the examples of WO98/58001; and Polymerisations were carried out in a 3.5 and 8 litre reactors fitted with a stirrer and a temperature control system. The same comonomer feeding system was used for all runs. The procedure comprised the following steps:

Polymerization of Lower Molecular Weight Ethylene Polymer:

The reactor was purged with nitrogen and heated to 110° C. 1200/3500 ml of liquid diluent was then added to the reactor and stirring started at 270 rpm. The reactor temperature was 80° C. Unsupported metallocene catalyst and methylaluminoxane (MAO) were then pre-contacted for 5 min and loaded into the reactor with 300 ml of diluent. Ethylene and hydrogen were then fed to achieve a certain total pressure. Ethylene and hydrogen were then fed continuously. When sufficient amount of powder was made, the polymerization was stopped and the hexane was evaporated.

Polymerization of Higher Molecular Weight Ethylene Polymer:

1500/3500 ml of liquid diluent was then added to the reactor and stirring started at 270 rpm. The reactor temperature was 80° C. Ethylene, hydrogen and 1-butene were then fed to achieve a certain total pressure. Ethylene, hydrogen and 1-butene were then fed continuously. When sufficient amount of powder was made, the polymerization was stopped and the hexane was evaporated.

Polymerization of Second Higher Molecular Weight Ethylene Polymer:

1500/3500 ml of liquid diluent was then added to the reactor and stirring started at 270 rpm. The reactor temperature was 80° C. Ethylene, hydrogen and 1-butene were then fed to achieve a certain total pressure. Ethylene, hydrogen and 1-butene were then fed continuously. When sufficient amount of powder was made, the polymerization was stopped and the hexane was evaporated.

Two comparative bimodal polymerisations were also carried out. The first comparative polymerisation (C1) was carried out in the same manner as above except that instead of using unsupported metallocene catalyst and MAO a supported catalyst with rac-ethylene-bis(4,5,6,7-tetrahydro-1-indenyl)zirconium dichloride) metallocene complex was used. The second comparative polymerisation (C2) was carried out in the same manner as above except that instead of using unsupported metallocene catalyst and MAO a supported catalyst with bis-n-butylcyclopentadienyl zirconium dichloride metallocene complex was used.

No reactor fouling on the walls occurred in any of the polymerisations E1-E5, C1 or C2. Further details of the polymerisation procedure and details of the resulting polyethylene polymers are summarised in Table 1 below wherein RI refers to the polymerisation in and the product of the first reactor, RII refers to the polymerisation in the second reactor and the product of the first and second reactor together, which is the final polyethylene product in a two stage polymerisation and RIII refers to the polymerisation in the third reactor and the product of the first, second and third reactors together, which is the final product in a three stage polymerisation.

Results

The results consistently showed the following:

The polymerisation activity (per mol metal) is much higher for the unsupported catalyst than the supported catalysts. This is particularly clear from FIGS. 2 and 3 wherein blue shows the activity of the first polymerisation, red shows the activity of the second polymerisation and green shows the total activity.

Catalyst productivity is high compared to supported metallocene catalyst (per mol metal)

The first polymerisation yields free flowing polyethylene particles with a bulk density of 100-200 g/dm$^3$ and the second polymerisation yields free flowing polyethylene particles with a bulk density of 200-300 g/dm³

The polymerisations carried out in example 1 and comparative example 1 are under identical conditions and with the same catalyst except that in example 1 the catalyst is unsupported, rather than supported as in comparative example 1. The polymerisations were run without the use of hydrogen in the second stage in order to produce bimodal polymers of the highest MW possible in the conditions employed.

A comparison of the results for example 1 and comparative example 1 in tables 1 and 2 show the following:

- The use of an unsupported single site catalyst in a bimodal polymerisation gives rise to polyethylene of significantly higher MW (142,000 c.f. 120,000 g/mol) than polymerisation with a supported version of the same catalyst under otherwise identical conditions.
- The use of an unsupported single site catalyst in a bimodal polymerisation gives rise to polyethylene of significantly lower $MFR_5$ (0.38 c.f. 1.14 g/10 min respectively) than polymerisation with a supported version of the same catalyst under otherwise identical conditions. The MFR values obtained using the unsupported single site catalyst render the bimodal polyethylene suitable for the production of pipe.
- The use of the unsupported single site catalyst in the bimodal polymerisation surprisingly did not lead to any reactor fouling.
- The use of the unsupported single site catalyst in the bimodal polymerisation produced polymer particles having good morphology and reasonably high bulk density (310 vs. 350 g/dm³)
- The use of the unsupported single site catalyst in the bimodal polymerisation produced polyethylene having a significantly lower ash content (500 c.f. 1310 wt ppm) than polymerisation with a supported version of the same catalyst under otherwise identical conditions.
- The use of the unsupported single site catalyst in the bimodal polymerisation produced polyethylene having significantly lower gels than polymerisation with a supported version of the same catalyst under otherwise identical conditions.

A comparison of the results for example 2 and comparative example 2 in tables 1 and 2 show the following:

- The use of an unsupported single site catalyst in a bimodal polymerisation gives rise to polyethylene of significantly higher MW (100,000 c.f. 60,000 g/mol) than polymerisation with a supported version of the same catalyst under otherwise identical conditions.
- The use of an unsupported single site catalyst in a bimodal polymerisation gives rise to polyethylene of significantly lower $MFR_{2.16}$ and $MFR_5$ (2.3 c.f. 13 g/10 min and 4.4 c.f. 31 g/10 min respectively) than polymerisation with a supported version of the same catalyst under otherwise identical conditions.
- The use of the unsupported single site catalyst in the bimodal polymerisation surprisingly did not lead to any reactor fouling.
- The use of the unsupported single site catalyst in the bimodal polymerisation produced polymer particles having good morphology and reasonably high bulk density.
- The use of the unsupported single site catalyst in the bimodal polymerisation produced polyethylene having a significantly lower ash content (470 c.f. 910 wt ppm) than polymerisation with a supported version of the same catalyst under otherwise identical conditions.
- The use of the unsupported single site catalyst in the bimodal polymerisation produced polyethylene having significantly lower gels than polymerisation with a supported version of the same catalyst under otherwise identical conditions.

The foreign particle content of the bimodal polymer product of example 2 (E2-RII) and comparative example 2 (C2-RII) was analysed using light microscopy as described above. The results are shown in FIGS. 4A (E2-RII) and 4B (C2-RII). A comparison of the results shows that when an unsupported single site catalyst was used no foreign particles were found on the sample plate. When a supported version of the same catalyst under otherwise identical conditions was used, a large amount of foreign particles (identified as silica) were found with light microscopy on the sample plate.

Table 3 shows the quantification of the foreign particles in the bimodal polymer product of example 2 (E2-RII) and comparative example 2 (C2-RII). This was done using image analysis. The particles were divided into different size categories (est. diameter).

A comparison of the results shows that no foreign particles were found on the sample plate when unsupported catalyst was used. When supported catalyst was used mostly particles with diameter sizes 20-40 µm and 40-60 µm were observed. This shows that the use of the unsupported single site catalyst in the bimodal polymerisation produced polyethylene having a significantly lower foreign particle, e.g. silica, content than polymerisation with a supported version of the same catalyst under otherwise identical conditions.

The polymerisations carried out in example 3 and comparative example 2 are with the same catalyst except that in example 3 the catalyst is unsupported, rather than supported as in comparative example 2, but under different conditions designed to yield the same bimodal polyethylene. In example 3, in the second stage polymerisation, hydrogen is present as a MW regulator whereas in comparative example 2 no hydrogen is used in either the first or second stage of polymerisation.

A comparison of the results for example 3 and comparative example 2 in tables 1 and 2 shows that the polymers produced have comparable density, $MFR_{2.16}$, $MFR_5$ and molecular weights. The polymer produced in example 3 using an unsupported single site catalyst, however, has a much lower ash content (320 wt c.f. 910 wt ppm).

The results for examples 4 and 5, which are both three stage polymerisations, show the following:

- The use of an unsupported single site catalyst in a trimodal polymerisation gives rise to polyethylene having a high MW (125,000 and 138,000 g/mnol), a density of circa 950 kg/dm³ and a $MFR_5$ value of 0.47 or 0.49 g/10 min. The MFR values obtained using the unsupported single site catalyst render the trimodal polyethylenes suitable for the production of pipe.
- The use of the unsupported single site catalyst in the trimodal polymerisation surprisingly did not lead to any reactor fouling.
- The use of the unsupported single site catalyst in the trimodal polymerisation produced polymer particles having good morphology
- The use of the unsupported single site catalyst in the trimodal polymerisation produced polyethylene having a low ash content and low gels.

The polymerisations carried out in examples 6-8 show the reactor fouling behaviour in first step homopolymerisation where MFR2 is less than 10. Tests E6, E7 and E8 were made to confirm the effect of polymer melt index to reactor fouling behavior. In E6 and E7 unsupported rac-ethylene-bis(4,5,6,7-tetrahydro-1-indenyl)zirconium dichloride) metallocene complex and in E8 unsupported bis-n-butylcyclopentadienyl zirconium dichloride metallocene complex was used. For E6 and E7, E1-RI is used as reference and for E8, E2-RI is used as reference.

In the reference tests E1-RI and E2-RI with MFR2>10, no reactor fouling or clump formation was observed. When the first stage polymerisation tests, E6, E7 and E8, were made by producing polymer with MFR2<10 (0.39, 2.1, 8.8, respectively), significant reactor fouling was observed in all tests. The level of reactor fouling was increased with decreasing melt index; in the tests E6, E7 and E8 about 40, 20 and 5 wt %, respectively, of the total polymer amount was attached on the reactor equipment surfaces. Besides the fouling on the reactor walls, also agglomeration and polymer clumps were obtained with E6 and E7. In all the examples E6, E7 and E8, reactor fouling and clumps caused major problems with reactor operation, e.g. with reactor cooling and stirring.

TABLE 1

| | | E1-RI | E1-RII | C1-RI | C1-RII | C2-RI | C2-RII | E2-RI | E2-RII |
|---|---|---|---|---|---|---|---|---|---|
| | | \multicolumn{8}{c}{Catalyst type} | | | | | | | | |
| | | Unsupported Catalyst | | Supported Catalyst | | Supported Catalyst | | Unsupported Catalyst | |
| | | \multicolumn{8}{c}{Complex type} | | | | | | | | |
| | | Et(tetrahydroind)2ZrCl2 | | Et(tetrahydroind)2ZrCl2 | | (nBuCp)2ZrCl2 | | (nBuCp)2ZrCl2 | |
| Mw of complex | g/mol | 426.2 | 426.2 | 426.2 | 426.2 | 404.2 | 404.2 | 404.2 | 404.2 |
| Al/Me | mol/mol | 1000 | 1000 | | | | | 1000 | 1000 |
| Complex amount | mg | 9.9 | 9.84 | | | | | 1.8 | 1.68 |
| Metal amount | mmol | 0.023 | 0.023 | 0.02 | 0.02 | 0.011 | 0.011 | 0.004 | 0.004 |
| MAO amount | g | 4.598 | | | | | | 0.882 | |
| MAO amount | ml | 5.11 | | | | | | 0.98 | |
| Catalyst | mg | | | 924 | 917 | 490 | 490 | | |
| POLYMERISATION | | Homo | Copo | Homo | Copo | Homo | Copo | Homo | Copo |
| Temperature | °C. | 80 | 80 | 80 | 80 | 80 | 80 | 80 | 80 |
| Total pressure | bar | 18.6 | 19.6 | 18.6 | 19.6 | 7.8 | 8.8 | 7.8 | 8.8 |
| Solvent | | i-butane | i-butane | i-butane | i-butane | hexane | hexane | hexane | hexane |
| Partial pressure of solvent | bar | 13.6 | 13.6 | 13.6 | 13.6 | 2.8 | 2.8 | 2.8 | 2.8 |
| Amount of solvent | ml | 3800 | 3800 | 3800 | 3800 | 1500 | 1500 | 1500 | 1500 |
| Stirring speed | rpm | 270 | 270 | 270 | 270 | 270 | 270 | 270 | 270 |
| Ethylene partial pressure | bar | 5 | 6 | 5 | 6 | 5 | 6 | 5 | 6 |
| Hydrogen (in C2 = feed) | vol ppm | 3950 | 0 | 3950 | 0 | 3000 | 0 | 3000 | 0 |
| Comonomer type | | — | 1-butene | — | 1-butene | — | 1-butene | — | 1-butene |
| Comonomer total | ml | 0 | 56 | 0 | 56 | 0 | 56 | 0 | 10 |
| Running time | min | 40 | 38 | 40 | 39 | 40 | 15 | 20 | 10 |
| Reactor split | w % | 50 | 50 | 50 | 50 | 50 | 50 | 52 | 48 |
| Yield | g | 890 | 885 | 670 | 660 | 260 | 255 | 150 | 140 |
| Activity | kg PE/mol Me*h | 58059 | 61115 | 49489 | 50376 | 36214 | 94714 | 101050 | 202100 |
| Total Activity | kg PE/mol Me*h | | 59548 | | 49927 | | 51662 | | 134733 |
| Activity | kg pol/g cat h | | | 1.09 | 1.11 | 0.80 | 2.08 | | |
| Productivity | kg PE/mol Me | 38706 | 38706 | 32992 | 32744 | 24143 | 23679 | 33683 | 33683 |
| Total Productivity | kg PE/mol Me | | 77412 | | 65737 | | 47357 | | 68570 |

| | | E3-RI | E3-RII | E4-RI | E4-RII | E4-RIII | E5-RI | E5-RII | E5-RIII |
|---|---|---|---|---|---|---|---|---|---|
| | | \multicolumn{8}{c}{Catalyst type} | | | | | | | | |
| | | Unsupported Catalyst | | Unsupported Catalyst | | | Unsupported Catalyst | | |
| | | \multicolumn{8}{c}{Complex type} | | | | | | | | |
| | | (nBuCp)2ZrCl2 | | Et(tetrahydroind)2ZrCl2 | | | Et(tetrahydroind)2ZrCl2 | | |
| Mw of complex | g/mol | 404.2 | 404.2 | 426.2 | 426.2 | 426.2 | 426.2 | 426.2 | 426.2 |
| Al/Me | mol/mol | 1000 | 1000 | 1000 | 1000 | 1000 | 1000 | 1000 | 1000 |
| Complex amount | mg | 1.7 | 1.58 | 16.2 | 15.9 | 15.6 | 16.2 | 15.9 | 15.6 |
| Metal amount | mmol | 0.004 | 0.004 | 0.038 | 0.037 | 0.036 | 0.038 | 0.037 | 0.037 |
| MAO amount | g | 0.833 | | 7.524 | | | 7.524 | | |
| MAO amount | ml | 0.93 | | 8.36 | | | 8.36 | | |
| Catalyst | mg | | | | | | | | |
| POLYMERISATION | | Homo | Copo | Homo | Copo | Copo | Homo | Copo | Copo |
| Temperature | °C. | 80 | 80 | 80 | 80 | 80 | 80 | 80 | 80 |
| Total pressure | bar | 7.8 | 8.8 | 16.2 | 16.6 | 16.6 | 16.2 | 16.6 | 16.6 |
| Solvent | | hexane | hexane | i-butane | i-butane | i-butane | i-butane | i-butane | i-butane |

TABLE 1-continued

|  |  |  |  |  |  |  |  |  |  |
|---|---|---|---|---|---|---|---|---|---|
| Partial pressure of solvent | bar | 2.8 | 2.8 | 13.6 | 13.6 | 13.6 | 13.6 | 13.6 | 13.6 |
| Amount of solvent | ml | 1500 | 1500 | 3800 | 3800 | 3800 | 3800 | 3800 | 3800 |
| Stirring speed | rpm | 270 | 270 | 270 | 270 | 270 | 270 | 270 | 270 |
| Ethylene partial pressure | bar | 5 | 6 | 5 | 6 | 6 | 5 | 6 | 6 |
| Hydrogen (in C2 = feed) | vol ppm | 3000 | 280 | 2400 | 150 | 0 | 2400 | 170 | 0 |
| Comonomer type |  | — | 1-butene | — | 1-butene | 1-butene | — | 1-butene | 1-butene |
| Comonomer total | ml | 0 | 10 |  | 5 | 90 |  | 5 | 80 |
| Running time | min | 20 | 8 | 40 | 27 | 5 | 40 | 36 | 5 |
| Reactor split | w % | 52 | 48 | 51 | 40 | 9 | 51 | 40 | 9 |
| Yield | g | 140 | 130 | 570 | 440 | 100 | 500 | 610 | 110 |
| Activity | kg PE/mol Me*h | 99861 | 249653 | 22494 | 26183 | 32881 | 19731 | 27293 | 36027 |
| Total Activity | kg PE/mol Me*h |  | 142659 |  |  | 24889 |  |  | 24260 |
| Activity | kg pol/g cat h |  |  |  |  |  |  |  |  |
| Productivity | kg PE/mol Me | 33287 | 33287 | 14996 | 11783 | 2740 | 13154 | 16376 | 3002 |
| Total Productivity | kg PE/mol Me |  | 66574 |  |  | 29867 |  |  | 32752 |

|  |  | Example Nos. | | |
|---|---|---|---|---|
|  |  | E6-RI | E7-RI | E8-RI |
|  |  | Catalyst type | | |
|  |  | Unsupported catalyst | Unsupported catalyst | Unsupported catalyst |
|  |  | Complex type | | |
|  |  | Et(tetrahydroind)2ZrCl2 | Et(tetrahydroind)2ZrCl2 | (nBuCp)2ZrCl2 |
| Mw of complex | g/mol | 426.2 | 426.2 | 404.2 |
| Al/Me | mol/mol | 1000 | 1000 | 1000 |
| Complex amount | mg | 3.6 | 1.4 | 2 |
| Metal amount | mmol | 0.008 | 0.003 | 0.005 |
| MAO amount | g | 1.672 | 0.650 | 0.979 |
| MAO amount | ml | 1.86 | 0.72 | 1.09 |
| Catalyst | mg |  |  |  |
| POLYMERISATION |  | Homo | Homo | Homo |
| Temperature | ° C. | 80 | 80 | 80 |
| Total pressure | bar | 6.4 | 6.4 | 6.4 |
| Solvent |  | hexane | hexane | hexane |
| Partial pressure of solvent | bar | 2.8 | 2.8 | 2.8 |
| Amount of solvent | Ml | 1500 | 1500 | 1500 |
| Stirring speed | Rpm | 270 | 270 | 270 |
| Ethylene partial pressure | bar | 5 | 5 | 5 |
| Hydrogen (in C2 = feed) | vol ppm | 0 | 900 | 900 |
| Comonomer type |  |  |  |  |
| Comonomer total | ml | 0 | 0 | 0 |
| Running time | min | 40 | 60 | 20 |
| Reactor split | w % | 100 | 100 | 100 |
| Yield | g | 100 | 160 | 200 |
| Activity | kg PE/mol Me*h | 17758 | 48709 | 121260 |
| Total Activity | kg PE/mol Me*h | 17758 | 48709 | 121260 |
| Activity | kg pol/g cat h |  |  |  |
| Productivity | kg PE/mol Me | 11839 | 48709 | 40420 |
| Total Productivity | kg PE/mol Me | 11839 | 48709 | 40420 |

TABLE 2

POLYMER ANALYSES

| | | Example | | | | | | | |
|---|---|---|---|---|---|---|---|---|---|
| | | E1-RI | E1-RII | C1-RI | C1-RII | C2-RI | C2-RII | E2-RI | E2-RII |
| | | Density | | | | | | | |
| Run Nos | kg/dm3 |  | 948 |  | 947 |  | 942 |  | 938.8 |
| MFR2.16 |  | 270 |  |  |  | 290 | 13 | 285 | 2.3 |
| MFR 5 |  |  | 0.38 |  | 1.1 |  | 31 |  | 4.4 |
| eta0.05 ($\eta^*_{0.05}$) |  |  |  |  |  |  | 740 |  | 7740 |
| eta300 ($\eta^*_{300}$) |  |  |  |  |  |  | 165 |  | 680 |
| SHI |  |  |  |  |  |  | 4 |  | 11 |

TABLE 2-continued

POLYMER ANALYSES

| | | | | | | |
|---|---|---|---|---|---|---|
| Mw | | | 142000 | 120000 | 60000 | 100000 |
| Mn | | | 24700 | 15300 | 18000 | 26000 |
| MWD | | | 5.8 | 7.8 | 3.3 | 3.9 |
| d10 | μm | | | | 180 | 155 |
| d50 | μm | | | | 435 | 240 |
| d90 | μm | | | | 800 | 440 |
| C4 content (FTIR) | w % | | 0.5 | 0.9 | 1.9 | 1.6 |
| Melting temperature | ° C. | 132.4 | 131.8 | 129.3 | | 127.4 |
| Crystallisation temperature | ° C. | 116.9 | 116.2 | 114.7 | | 113 |
| Heat of Fusion | J/g | 273 | 232 | 230 | | 181 |
| Crystallinity | % | 94 | 80 | 79 | | 62.5 |
| BD | g/dm3 | | 310 | 350 | 260 | 130 |
| Ash content | wtppm | | 500 | 1310 | 910 | 470 |

| | | Example | | | | | | |
|---|---|---|---|---|---|---|---|---|
| | | E3-RI | E3-RII | E4-RI | E4-RII | E4-RIII | E5-RI | E5-RII | E5-RIII |
| Run Nos | kg/dm3 | | 941 | | | 949.1 | | 952.8 | 949 |
| MFR2.16 | | | 12 | 106 | | | | | |
| MFR 5 | | | 32 | | | 0.47 | | | 0.49 |
| eta0.05 ($\eta^*_{0.05}$) | | | 660 | | | | | | |
| eta300 ($\eta^*_{300}$) | | | 120 | | | | | | |
| SHI | | | 5 | | | | | | |
| Mw | | | 60000 | | | 125000 | | | 138000 |
| Mn | | | 19000 | | | 29000 | | | 29700 |
| MWD | | | 3.2 | | | 4.3 | | | 4.7 |
| d10 | μm | | 45 | | | | | | |
| d50 | μm | | 110 | | | | | | |
| d90 | μm | | 400 | | | | | | |
| C4 content (FTIR) | w % | | 1.4 | | | 0.5 | | | 0.5 |
| Melting temperature | ° C. | 132.9 | 127.9 | 132.5 | 133.5 | 133.1 | | | 132.8 |
| Crystallisation temperature | ° C. | 116.9 | 112.6 | 115.7 | 117.6 | 117.1 | | | 116.8 |
| Heat of Fusion | J/g | 233 | 193 | 251 | 234 | 240 | | | 235 |
| Crystallinity | % | 80.5 | 66.5 | 86.5 | 81 | 82.5 | | | 81 |
| BD | g/dm3 | | 190 | | | 240 | | | 200 |
| Ash content | wtppm | | 320 | | | | | | |

| | | Example | | |
|---|---|---|---|---|
| | | E6-RI | E7-RI | E8-RI |
| Run Nos | kg/dm3 | 940.1 | 954.5 | 957.2 |
| MFR2.16 | | 0.39 | 2.1 | 8.8 |
| MFR 5 | | | | |
| eta0.05 ($\eta^*_{0.05}$) | | 56156 | 4686 | 1019 |
| eta300 ($\eta^*_{300}$) | | 857 | 809 | 346 |
| SHI | | | | |
| Mw | | 165000 | 105000 | 80000 |
| Mn | | 41000 | 42000 | 34000 |
| MWD | | 4 | 2.5 | 2.3 |
| d10 | μm | | | |
| d50 | μm | | | |
| d90 | μm | | | |
| C4 content (FTIR) | w % | | | |
| Melting temperature | ° C. | | | |
| Crystallisation temperature | ° C. | | | |
| Heat of Fusion | J/g | | | |
| Crystallinity | % | | | |
| BD | g/dm3 | | | |
| Ash content | wtppm | | | |

TABLE 3

| | Foreign particle analysis | | | |
| --- | --- | --- | --- | --- |
| | E2-RII | | C2-RII | |
| Particle diameter (μm) | No. of particles | Area fraction (%) | No. of particles | Area fraction (%) |
| 0-20 | 0 | 0 | 56 | 11 |
| 20-40 | 0 | 0 | 32 | 32 |
| 40-60 | 0 | 0 | 17 | 47 |
| 60-80 | 0 | 0 | 2 | 11 |

The invention claimed is:

1. A metallocene multimodal polyethylene comprising:
   i) a multimodal molecular weight distribution;
   ii) a weight average molecular weight of at least 50,000 g/mol;
   iii) a $MFR_2$ of less than 0.2 g/10 min;
   iv) a $MFR_5$ of less than 1 g/10 min;
   v) a bulk density of at least 250 g/dm$^3$; and
   vi) an ash content of less than 800 ppm wt;
   wherein said multimodal polyethylene is prepared with a single catalyst, wherein said single catalyst is an unsupported metallocene catalyst.

2. A metallocene multimodal polyethylene as claimed in claim 1, wherein said metallocene multimodal polyethylene contains less than 100 wt ppm of material of hardness more than 3 on Moh's scale.

3. A pipe comprising metallocene multimodal polyethylene as claimed in claim 1.

4. The metallocene multimodal polyethylene as claimed in claim 1, wherein said metallocene multimodal polyethylene has a Mw of 100,000-250,000 g/mol.

5. The metallocene multimodal polyethylene as claimed in claim 1, wherein said metallocene multimodal polyethylene has a Mn of 18,000 to 40,000 g/mol.

6. The metallocene multimodal polyethylene as claimed in claim 1, wherein said metallocene multimodal polyethylene has a MWD of 1 to 25.

7. The metallocene multimodal polyethylene as claimed in claim 1, wherein said metallocene multimodal polyethylene has a $MFR_2$ of 0.005-0.2 g/10 min.

8. The metallocene multimodal polyethylene as claimed in claim 1, wherein said metallocene multimodal polyethylene has a $MFR_5$ of 0.05-1 g/10 min.

9. The metallocene multimodal polyethylene as claimed in claim 1, wherein said metallocene multimodal polyethylene has a density of 920-970 kg/m$^3$.

10. The metallocene multimodal polyethylene as claimed in claim 1, wherein said metallocene multimodal polyethylene is in the form of powder.

11. The metallocene multimodal polyethylene as claimed in claim 10, wherein said metallocene multimodal powder has a bulk density of 250-400 g/dm$^3$.

12. The metallocene multimodal polyethylene as claimed in claim 1, wherein said metallocene multimodal polyethylene is in the form of particles.

13. The metallocene multimodal polyethylene as claimed in claim 12, wherein said metallocene multimodal particles have a bulk density of 250-400 g/dm$^3$.

14. The metallocene multimodal polyethylene as claimed in claim 1, wherein said metallocene multimodal polyethylene has an ash content of 0 to 600 wt ppm.

15. The metallocene multimodal polyethylene as claimed in claim 1, wherein said metallocene multimodal polyethylene has an ash content of 0 to 400 wt ppm.

16. The metallocene multimodal polyethylene as claimed in claim 1, wherein said metallocene multimodal polyethylene has a fluorocarbon and fluorocarbyl content of less than 20 wt ppm.

17. The metallocene multimodal polyethylene as claimed in claim 1, wherein said metallocene multimodal polyethylene has a bimodal or trimodal molecular weight distribution.

18. The metallocene multimodal polyethylene as claimed in claim 1, wherein said metallocene multimodal polyethylene does not contain silica.

19. The metallocene multimodal polyethylene as claimed in claim 1, wherein said metallocene multimodal polyethylene comprises 98 to 99.9% wt ethylene monomer.

* * * * *